(12) United States Patent
Shapiro

(10) Patent No.: US 11,834,090 B1
(45) Date of Patent: Dec. 5, 2023

(54) CONVERTIBLE REAR CARGO CARRIER

(71) Applicant: Jeffrey Bryan Shapiro, Birmingham, AL (US)

(72) Inventor: Jeffrey Bryan Shapiro, Birmingham, AL (US)

( * ) Notice: Subject to any disclaimer, the term of this patent is extended or adjusted under 35 U.S.C. 154(b) by 59 days.

(21) Appl. No.: 17/839,503

(22) Filed: Jun. 14, 2022

(51) Int. Cl.
| | |
|---|---|
| *B62B 5/00* | (2006.01) |
| *B60R 9/06* | (2006.01) |
| *B62B 5/06* | (2006.01) |
| *B62B 1/12* | (2006.01) |

(52) U.S. Cl.
CPC .............. *B62B 5/0003* (2013.01); *B60R 9/06* (2013.01); *B62B 1/125* (2013.01); *B62B 5/067* (2013.01)

(58) Field of Classification Search
CPC ....... B62B 5/0003; B62B 5/067; B62B 1/125; B60R 9/06
See application file for complete search history.

(56) References Cited

U.S. PATENT DOCUMENTS

| | | | |
|---|---|---|---|
| 5,732,866 | A | 3/1998 | Janek |
| 6,168,058 | B1 * | 1/2001 | Janek ...................... B60R 9/065 220/9.3 |
| 6,419,244 | B2 | 7/2002 | Meabon |
| 7,641,235 | B1 | 1/2010 | Anduss |
| 7,905,508 | B2 | 3/2011 | Crawford |
| 8,505,932 | B1 | 8/2013 | Piccirillo |
| 8,985,418 | B1 | 3/2015 | Poudrier |
| 9,375,986 | B1 | 6/2016 | Dykstra |
| 9,789,804 | B2 | 10/2017 | Brinkley |
| 10,065,566 | B1 | 9/2018 | Harbaugh |
| 10,189,419 | B2 | 1/2019 | Billard |
| 10,239,462 | B2 | 3/2019 | Sorey |
| 10,549,701 | B2 | 2/2020 | Williams |
| 10,562,463 | B1 | 2/2020 | Speer |
| 10,780,907 | B1 | 9/2020 | Camarco |
| 10,843,635 | B2 | 11/2020 | Bradle |
| 10,843,717 | B2 | 11/2020 | Ingleson |
| 11,279,296 | B2 * | 3/2022 | Condon, II ............. B60R 9/065 |
| 2004/0173654 | A1 | 9/2004 | McAlister |
| 2006/0118586 | A1 | 6/2006 | Heravi |
| 2006/0145461 | A1 | 7/2006 | Anderson |
| 2008/0100076 | A1 | 5/2008 | Potts |
| 2009/0146394 | A1 | 6/2009 | Seivert |
| 2010/0066069 | A1 | 3/2010 | Bradshaw |

(Continued)

*Primary Examiner* — Bryan A Evans
(74) *Attorney, Agent, or Firm* — The Gache Law Firm, P.C.; Russell C. Gache

(57) ABSTRACT

The invention combines the best features of a cargo carrier with an upright dolly in a single unit to allow a user to safely offload heavy cargo from a carrier and transport that cargo to a final destination. The carrier includes a loading platform that engages a pair of loading hooks on the carrier and automatically locks the carrier to the loading platform. To offload the cargo, a user releases a self-locking latch with a lever and pivots the carrier around a loading bar until supported by a pair of wheels on the underside of the carrier. The rotational movement simultaneously disengages the loading hooks from the loading bar allowing the user to push the carrier away from the loading platform so that the carrier and its cargo may be transported to a final destination with the same ease with which a user would transport cargo on a dolly.

12 Claims, 24 Drawing Sheets

(56) References Cited

U.S. PATENT DOCUMENTS

2011/0049207 A1\* 3/2011 Hufgard .................. B60P 3/122
                                                        224/510
2018/0050712 A1   2/2018  Mitchell
2020/0130722 A1   4/2020  Gamache
2020/0361508 A1  11/2020  Winden \* cited by examiner

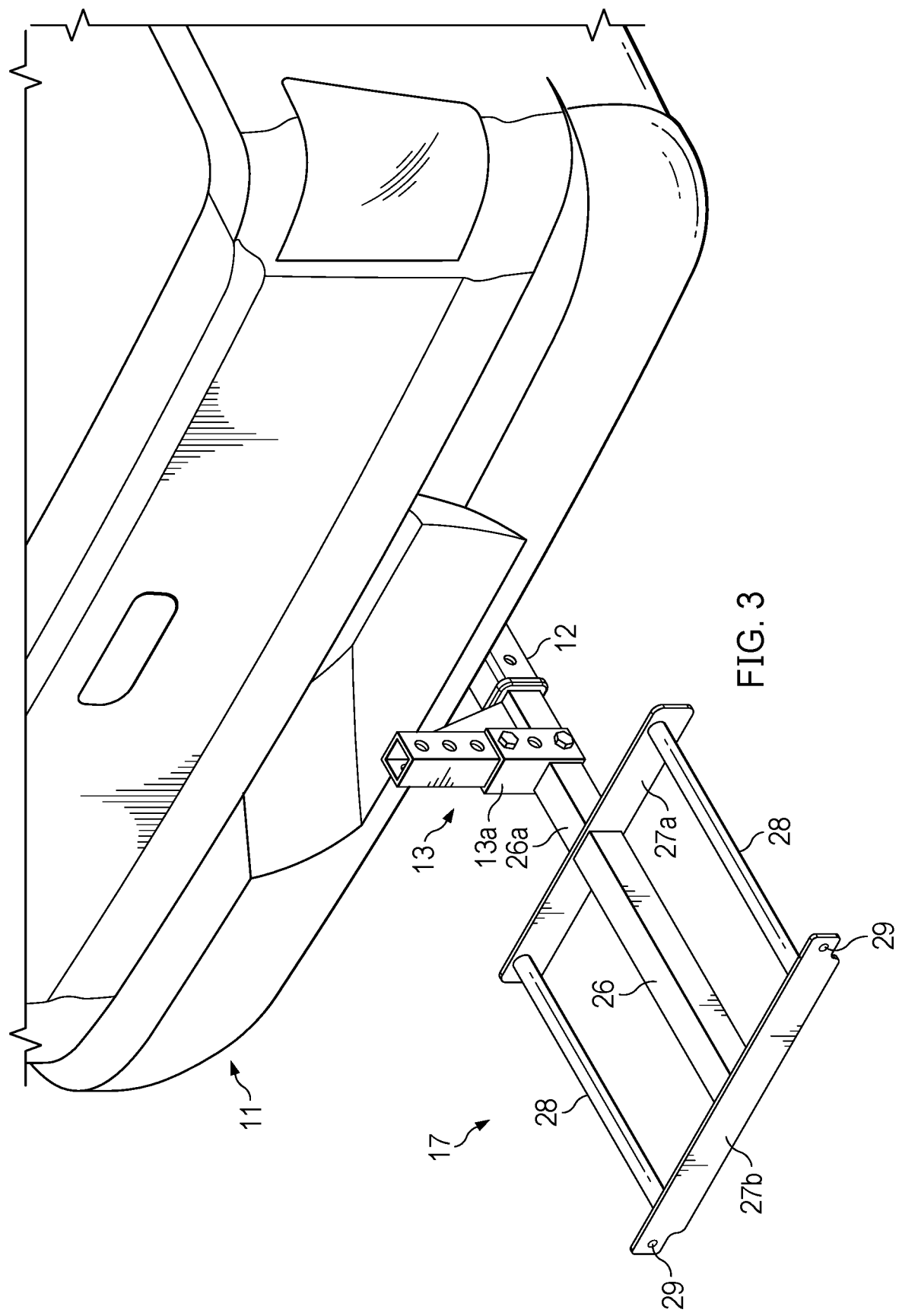

CONVERTIBLE REAR CARGO CARRIER

FIELD OF THE INVENTION

The present invention relates generally to cargo carriers that are supported by the rear trailer hitch of a vehicle. The invention also relates to hand trucks and carts for carrying items from one place to another.

BACKGROUND OF THE INVENTION

Vehicle rear mounted cargo carriers supported by towing hitches have been around for many years. Referred to as "hitch cargo carriers," these carriers typically are affixed to and supported by a towing hitch which is installed on the rear of most modern vehicles with a hitch bar that extends upward from the towing hitch. This is especially true of SUV's which usually include towing hitches as part of a standard equipment option. These cargo carriers provide additional cargo space outside the vehicle and usually include a deck or tray comprised of fixed, resilient mesh which holds the cargo and resists movement of that cargo.

Aside from the ability to install and remove the carriers at will from the vehicle hitch, cargo carriers are static and all cargo is loaded manually onto the cargo deck. Cargo carriers are usually a single, unitized heavy piece of equipment and can be a challenge for many users to lift and position into place on the hitch receiver. Moreover, once a destination is reached, the cargo is usually hand-carried to a final destination or a secondary type of transportable carrier is incorporated to off-load and transport the cargo to a final destination.

Another issue that faces users is the daunting task of unloading heavy items from the carrier. Usually, a user simply employs help to load heavy items onto a carrier. However, upon reaching their destination the user is faced with the task of lifting-off those heavy cargo items. Injuries often occur in this scenario as the user tries to remove the heavy items by themselves, often resulting in debilitating injuries like back or knee injuries. In fact, professional movers have learned the hard way that a hand truck or dolly is required to move cargo from the carrier to a final destination once off-loaded from the carrier because injuries will result when the cargo is heavy. Moreover, often the cargo must be transported a lengthy distance to a final destination, such as when bulky sports equipment must be transported to a ball field from a remote parking lot. So, in addition to being exposed to injury, a user may be physically exhausted by the time they arrive at a final destination which is unpleasant and undesirable.

Hence, modern cargo carriers serve a limited purpose of transporting cargo from one point to another while on a vehicle, but only to the extent that the vehicle transporting the cargo has direct access to a final destination and other helpers are available at the final destination to off-load the cargo. What would be better, and what is needed, is a cargo carrier that includes the ability to safely offload heavy cargo and transport that cargo to a final destination with a minimum of effort but with a maximum of safety.

SUMMARY OF THE INVENTION

The invention combines the best features of a cargo carrier with an upright dolly in a single unit to allow a user to safely offload heavy cargo from a carrier and transport that cargo to a final destination. The invention includes a semi-permanent loading platform that supports a combined cargo basket and hand truck or upright dolly. The platform includes a pair of loading bars each one of which may engage a pair of loading hooks that are positioned on the underside of the dolly portion of the invention. A second loading bar is positioned an equal distance from a main center bar of the loading platform and is cooperatively positioned to engage a self-locking latch mechanism on the underside of the carrier. To offload cargo, a user releases the self-locking latch with a lever and pivots the carrier around the loading bar engaged with the loading hooks so that the carrier is supported by a pair of wheels on the underside of the carrier. The rotational movement simultaneously disengages the loading hooks from the loading bar allowing the user to push the carrier away from the loading platform so that the carrier and its cargo may be transported to a final destination with the same ease with which a user would transport cargo on a dolly.

Other features and objects and advantages of the present invention will become apparent from a reading of the following description as well as a study of the appended drawings.

BRIEF DESCRIPTION OF THE DRAWINGS

A convertible rear cargo carrier incorporating the features of the invention is depicted in the attached drawings which form a portion of the disclosure and wherein:

FIG. 3 is a top perspective view of the loading platform with the cargo carrier removed;

DESCRIPTION OF THE PREFERRED EMBODIMENTS

Figure 1:
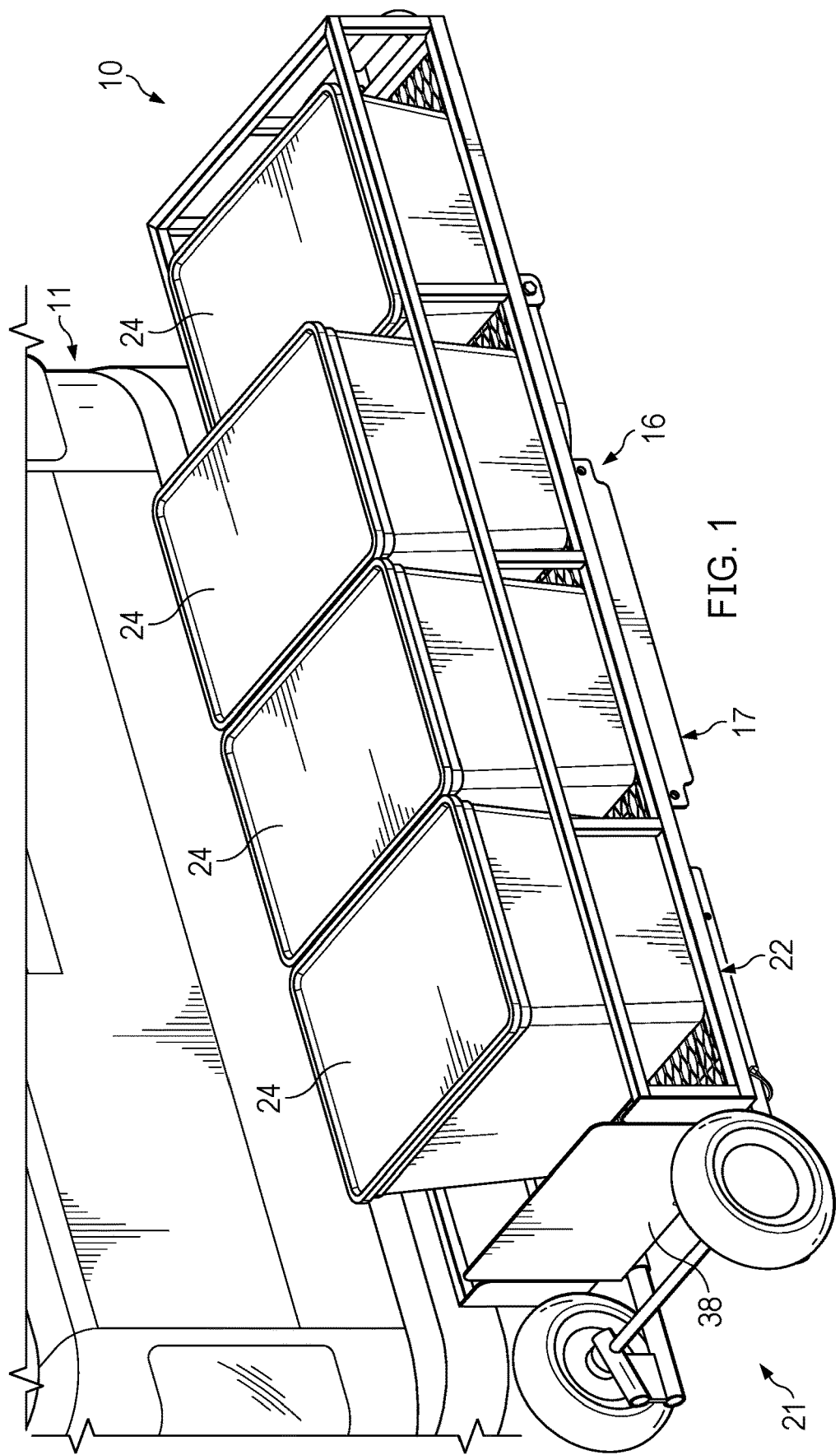
FIG. 1 is a top perspective view of the cargo carrier showing the placement of the carrier in relation to a vehicle holding cargo.
Figure 2:
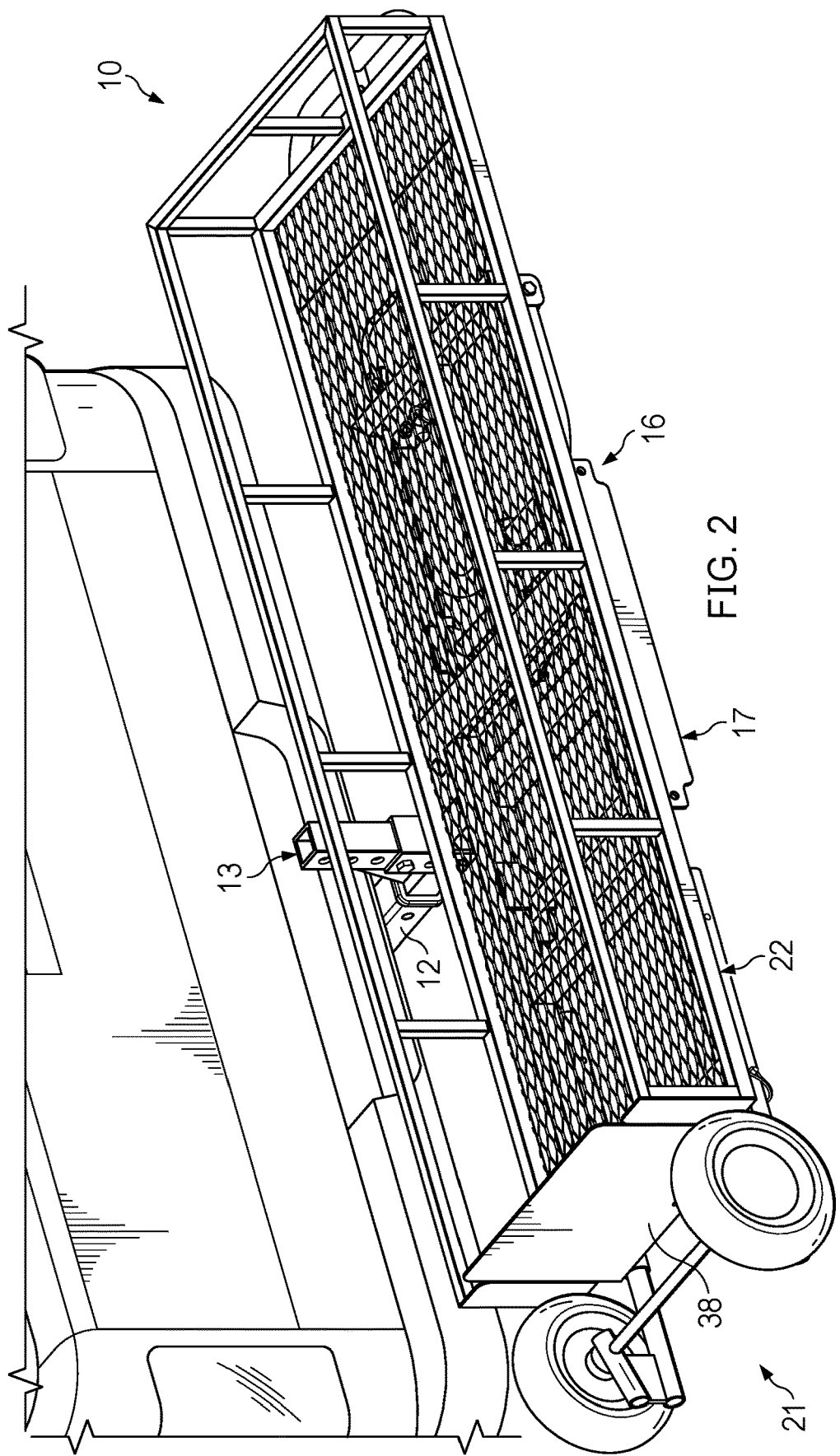
FIG. 2 is a top perspective view of the cargo carrier without cargo and showing the storage position of the dolly wheels.

Referring to the drawings for a better understanding of the function and structure of the invention, FIGS. 1-2 show the cargo carrier 10 supported by an adjustable hitch 13 inserted into a hitch receiver 12. The receiver 12 is installed onto the frame of a typical SUV vehicle 11 as is customary in the industry and that today usually comes standard on SUV type vehicles. The hitch 13 is integral with a docking or loading platform 17 that includes a docking mechanism 16 to a secure wheeled dolly assembly 21 to it, and that supports a carrier basket 22 for the transportation of various types of cargo 24. A wheel assembly 31, may be attached to the dolly assembly 21 in a storage configuration, as shown, so that the wheels of the assembly 31 do risk contacting the ground during movement of the SUV. The wheel assembly is repositioned 180 degrees on the assembly 31 prior to unloading the assembly 21 from the loading platform, as will be discussed.

FIG. 3 shows the loading platform 17 integrated with and supported by hitch 13. Platform 17 includes a main center bar 26 having a forward section 26a integrated with a clamping section 13a. Clamping section 13a surrounds hitch portion 13 allowing for the raising and lowering of loading platform 17 by raising or lowering section 13a relative to hitch 13. Hitch 13 and section 13a are secured together with one or more bolts as shown.

Platform 17 includes forward and rear support members 27a,b bisected by main center bar 26 and having a rectangular flange shape. Loading bars 28 connect each support member 27 at their ends as shown. Preferably, loading bars 28 have a rounded shape to facilitate loading and unloading of dolly assembly 21, as will be described.

Referring to FIGS. 4-7, dolly assembly 21 includes cargo carrier basket 22 supported by a dolly portion 40, with wheel assembly 31 repositioned to support dolly portion 40 above the ground in a transportable manner. Dolly portion 40 includes a lower end positioned plate 38 for supporting cargo, the wheel assembly 31, and a kickstand 32 for supporting the dolly assembly 21 in a leveling manner when positioned horizontally to the ground. As shown in FIG. 4A, basket 22 and dolly portion 40 form an integrated whole (21) for moving cargo when connected together.

Figure 4A:
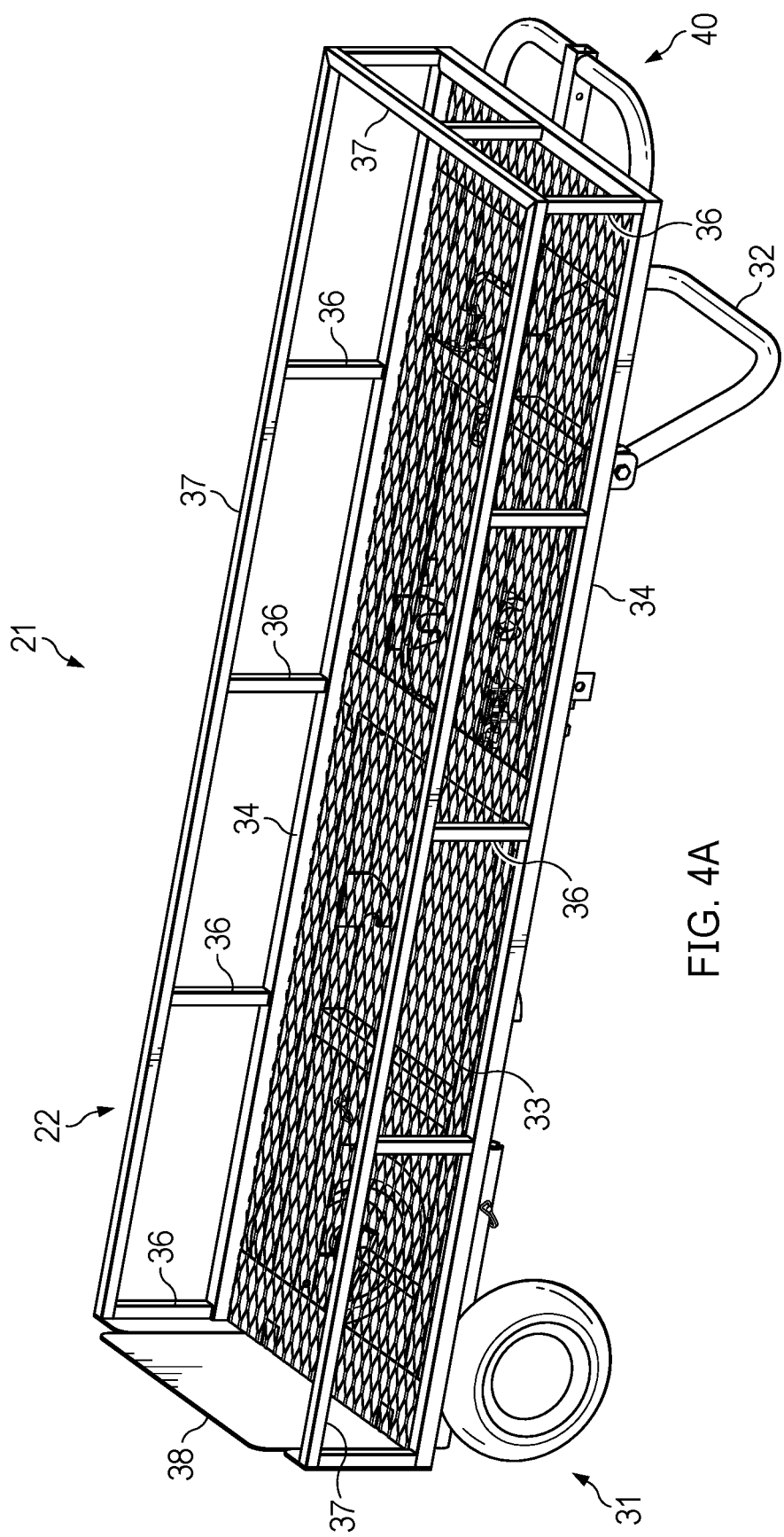
FIG. 4A is a top perspective view of the cargo carrier removed from the vehicle with the wheels moved into the transportation position and a kickstand deployed to support the carrier on a surface in a horizontal position.
Figure 4B:
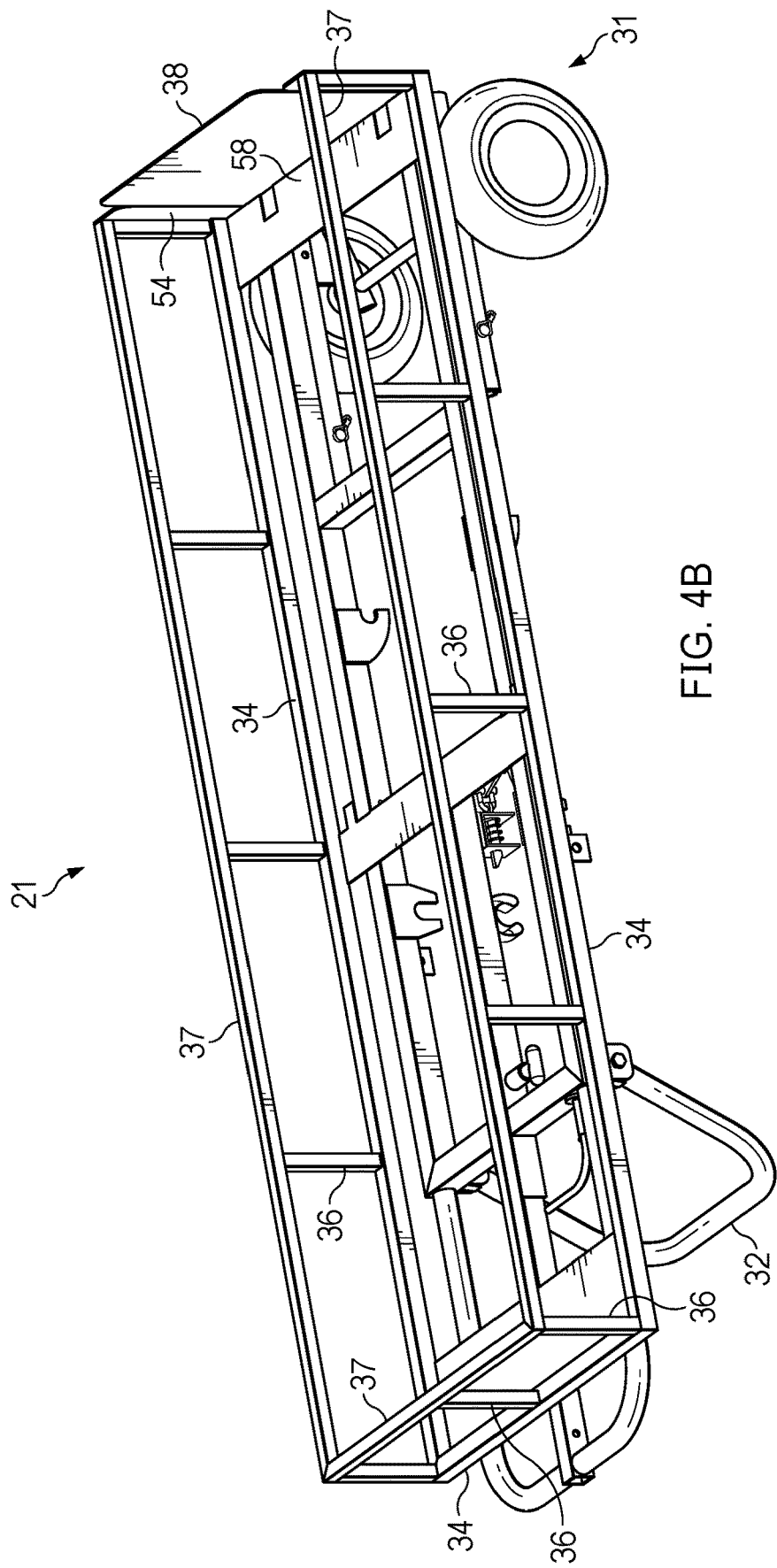
FIG. 4B is an alternative perspective view of the cargo carrier with the wire mesh decking removed from the carrier.
Figure 5:
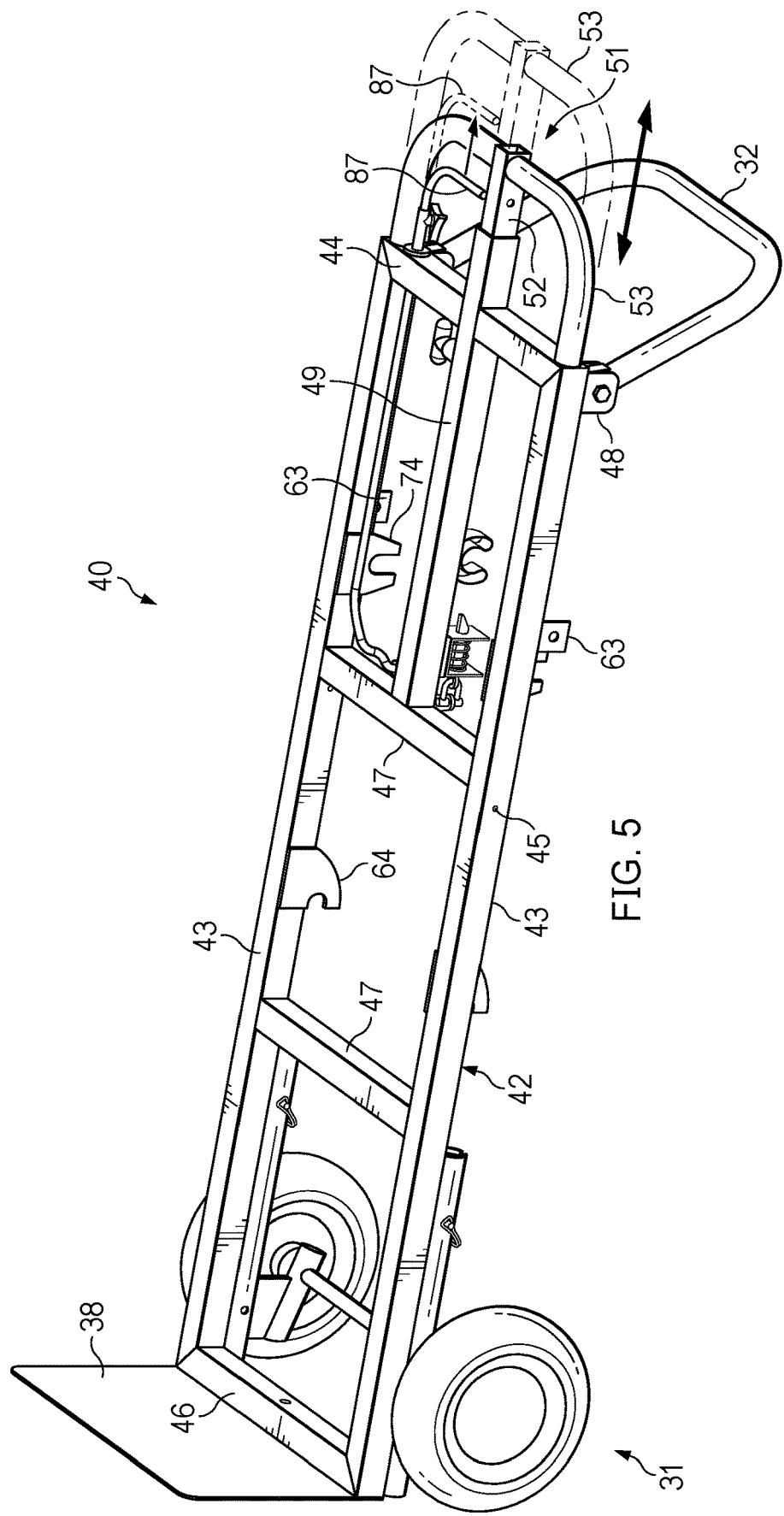
FIG. 5 is a perspective view of the cargo carrier positioned horizontally on a surface with the cargo basket removed.

FIG. 4B shows the dolly assembly 21 with the basket wire mesh loading deck 33 having been removed, and FIG. 5 shows the dolly portion 40 with the carrier basket 22 removed and positioned horizontally with respect to the ground. Dolly portion 40 consists of a shaped rectangle 42 of rectangular pipes such as a pair of parallel side pipes 43 connected at their ends with an upper section 44, a lower portion 46, and a pair of middle connecting portions 47. Lower portion 46 supports base plate 38 at a lower end thereof, and a central spar 49 further connects upper central member 47 to upper member 44 via spar 49. Spar 49 is sized to receive a telescoping handle 51 via rectangular tube 52 and curved and rounded tubing 53 that has it ends sized to extend into the upper ends of side member 43. Tubing 53 essentially acts as a handlebar for manipulating dolly portion 40 into position for loading. As shown in FIG. 5, handle 51 with handlebars 53 may be translated away from upper member 44 by removing a set pin that extends through a plurality of receiving set pin holes cooperatively drilled through member 52 and spar 49 so that a plurality of distances may be selected for positioning handle 51 a desired distance from rectangular frame 42. Importantly, release lever 87 is extendable a commensurate distance with handle 51 so that when basket 22 is placed onto dolly 40 (see FIG. 4A) handle 51 may still be effectively used as an elongated lever to raise and lower cargo more easily above the ground, as well as to more easily pivot cargo onto the loading platform 17. Further, release lever 87 may be extended to remain within grasp of a hand holding onto handlebar 53 so that a user may actuate the release lever without letting go of handlebar 53.

Dolly 40 includes a pair of locking tabs 63 positioned to depend downward from side members 43 and are sized to match a corresponding locking aperture 29 (see FIG. 3) so that dolly assembly 21 may be locked with a combination lock (not shown) onto loading platform 17 when loaded.

Figure 6:
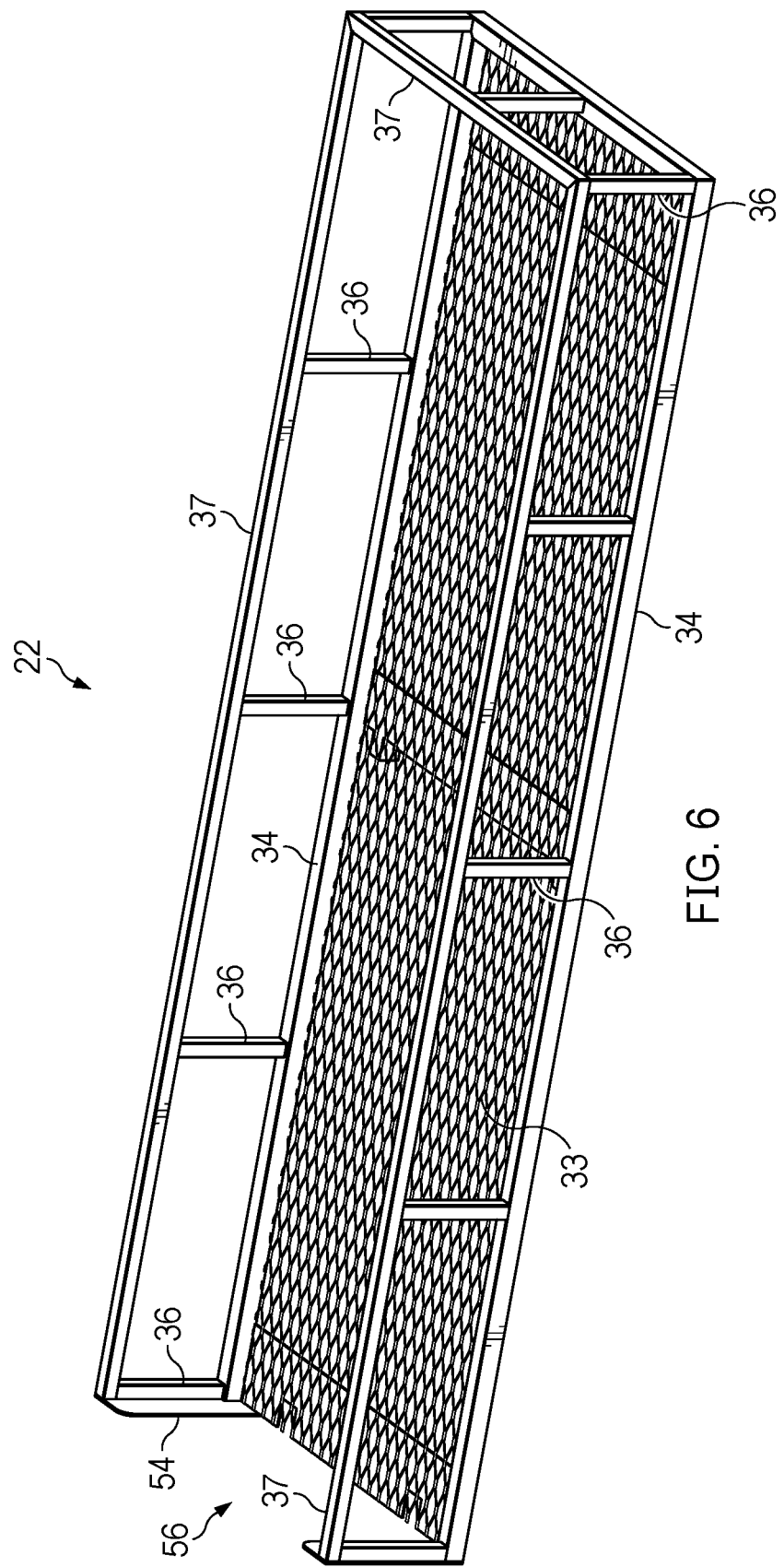
FIG. 6 is a top perspective view of the carrier cargo basket removed from the dolly portion of the invention.
Figure 7:
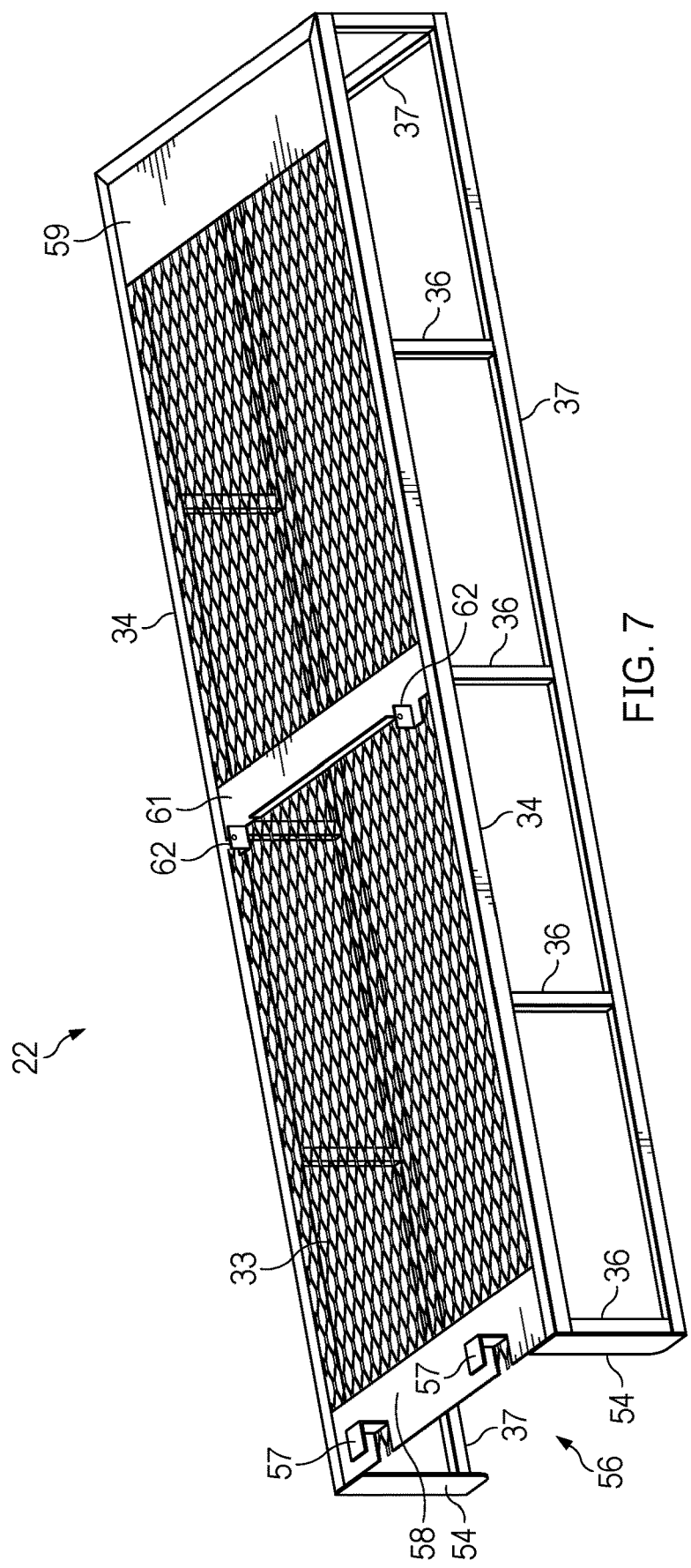
FIG. 7 is a bottom perspective view of the carrier cargo basket removed from the dolly portion of the invention.

Referring to FIGS. 6 and 7, basket 22 includes an open rectangular base of light weight rectangular tubing 34 connected to a spaced upper railing 37 by a series of upstanding tubes 36. A resilient wire mesh 33 connects the base 34 to form a deck to support cargo placed onto the carrier 10. The deck is further supported by three rigid flange members 58, 59, and 61, spanning the members 34 of the rectangle base. While deck 33 is shown using wire mesh, it will be understood that various types of materials may be incorporated to form the deck. For example, a plurality of horizontal aluminum or steel support members could be used in place of the wire mesh to form the deck 33, or simply a flat sheet of metal would be suitable. As shown, the configuration forms an opening at one end 56 that is framed at its sides by flanges 54 so that when combined with dolly portion 40 base plate 38 is supported by these flanges and encloses the gap 56 for form a reinforced cargo support when dolly assembly 21 is positioned vertically to move cargo. Cutout tabs 57 are sized and positioned to engage lower dolly member 46 in a locking manner, and a pair of downward depending tabs 62 are positioned to guide basket 22 onto dolly portion 40 so that aperture 45 (FIG. 8) aligns with an aperture in tabs 62 so that a locking pin (not shown) may be inserted into aperture 45 to lock basket 22 to dolly portion 40 when combined together.

Figure 8:
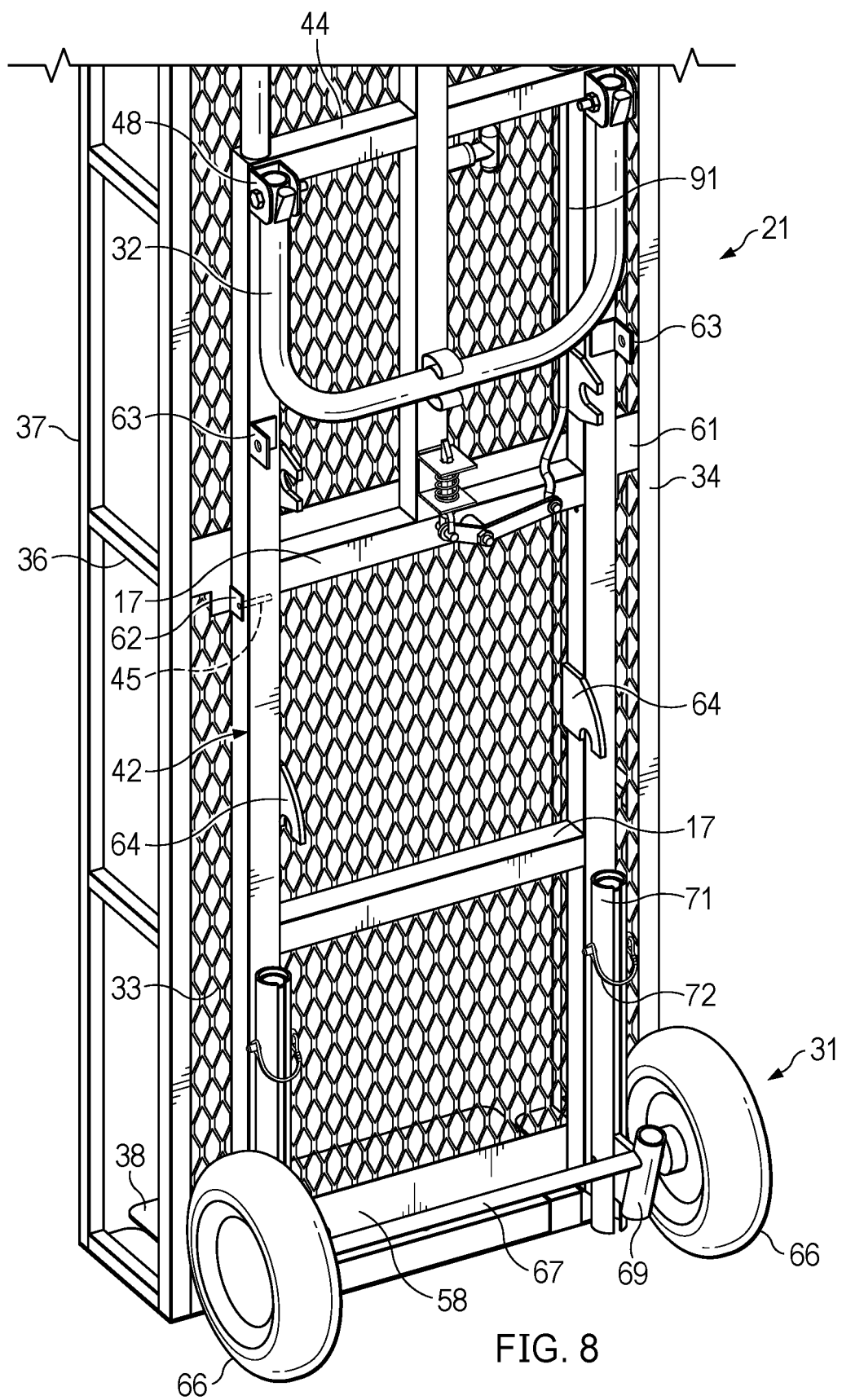
FIG. 8 is a magnified bottom perspective view of the cargo carrier.
Figure 9:
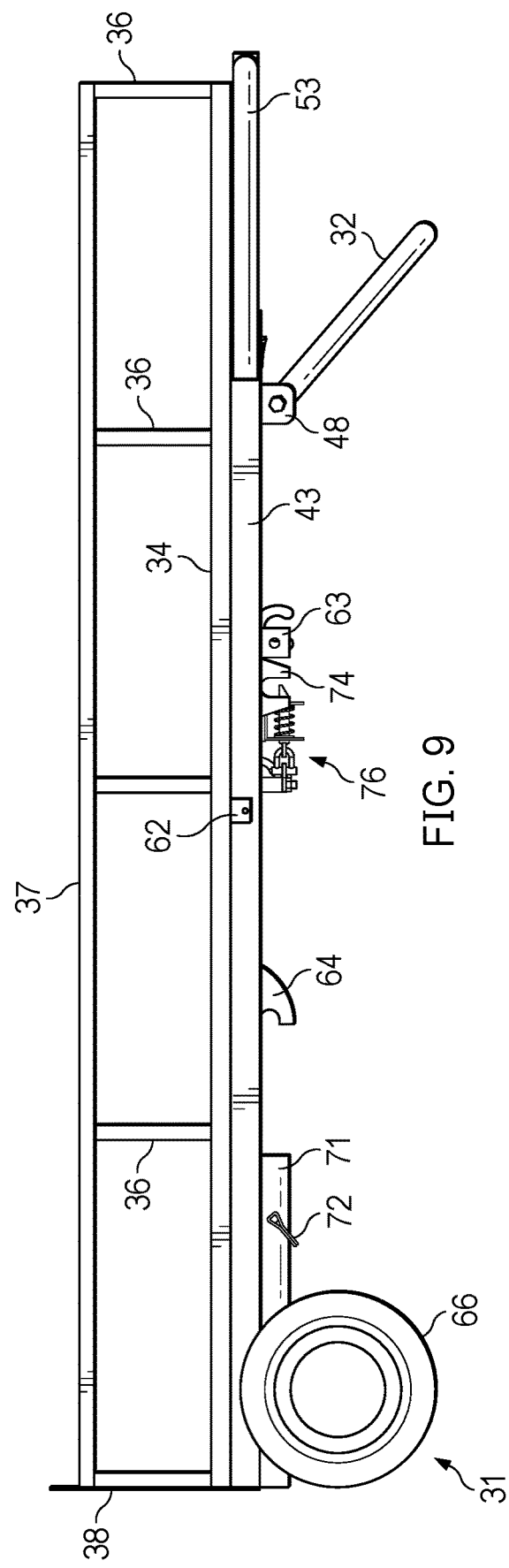
FIG. 9 is a side elevational view of the cargo carrier.
Figure 10:
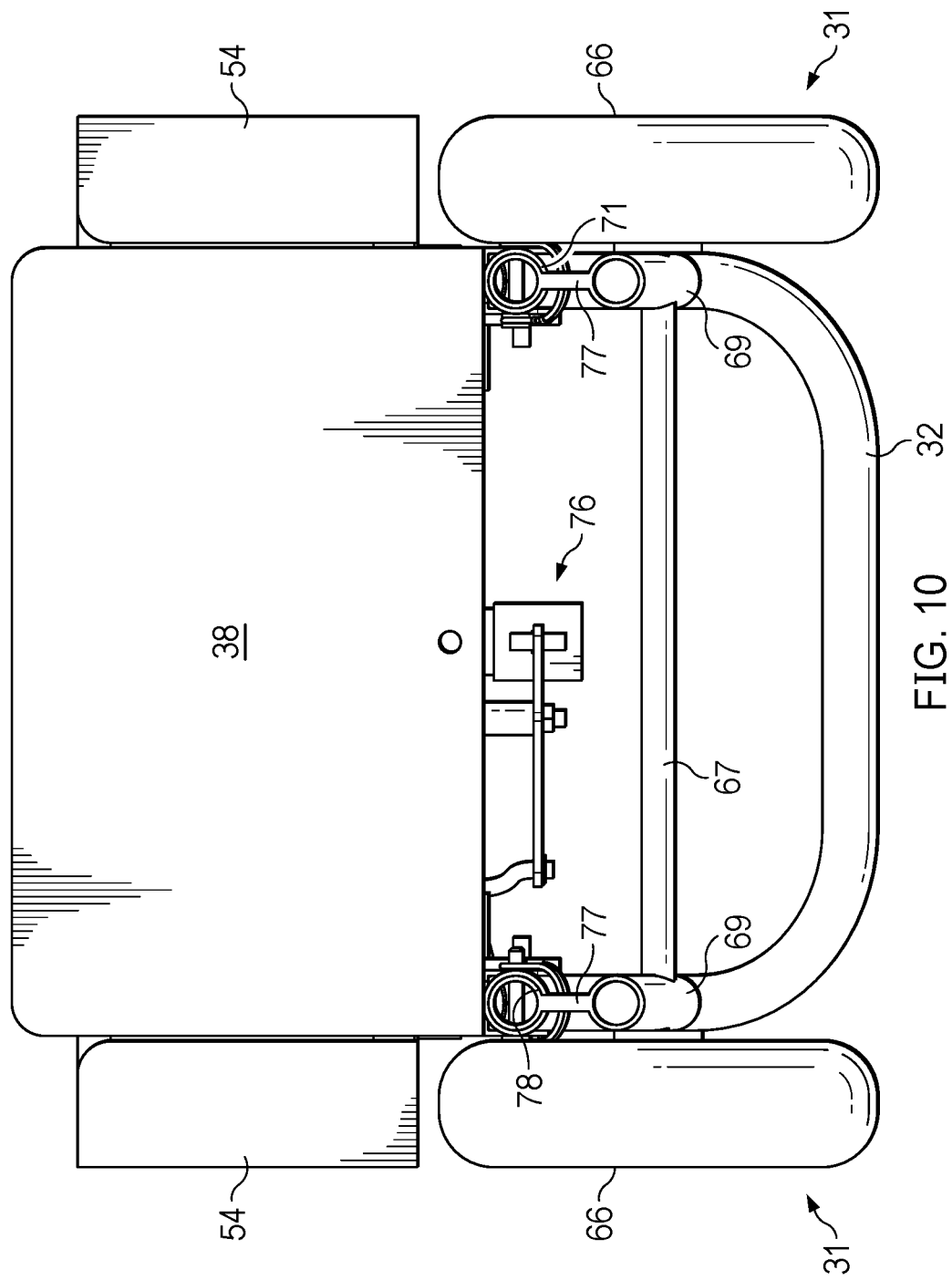
FIG. 10 is an end elevational view of the cargo carrier from the baseplate end of the cargo carrier.

Referring now to FIGS. 8-10, it may be further seen ground supporting features of dolly assembly 21. Kickstand 32 is rotatably affixed to dolly frame 42 via clasp retaining members 48, and wheel assembly 31 is affixed to dolly assembly 21 via slidable support tubes 71 and 78. Wheels 66 are connected to one another via axle 67 and supported by a pair of angled tube supports 69. A weldment 77 connects angled support 69 with inner wheel assembly support tube 78 at a fixed angle such that wheels 66 may be positioned above the decking 33 when the wheel assembly 31 is in a storage position and below the decking 33 when positioned to support the dolly assembly 21 on the ground for travel.

Inner wheel support tube 78 is sized to slide into outer tube 71 in a manner that minimizes play between the two supports when engaged within one another, however as may be understood the wheel assembly 31 may be withdrawn from support 71 and rotated such that each inner support 78 may be repositioned into the opposite outer tube support 71. Due to the angled weldment 77, such an exchange action places the wheel assembly in either a storage position or a ground travel position. In either position, wheel assembly 31 is locked into place with a pair of locking pins 72 each having a safety pin, such as a 2 wire snap clasp as shown.

Figure 11:
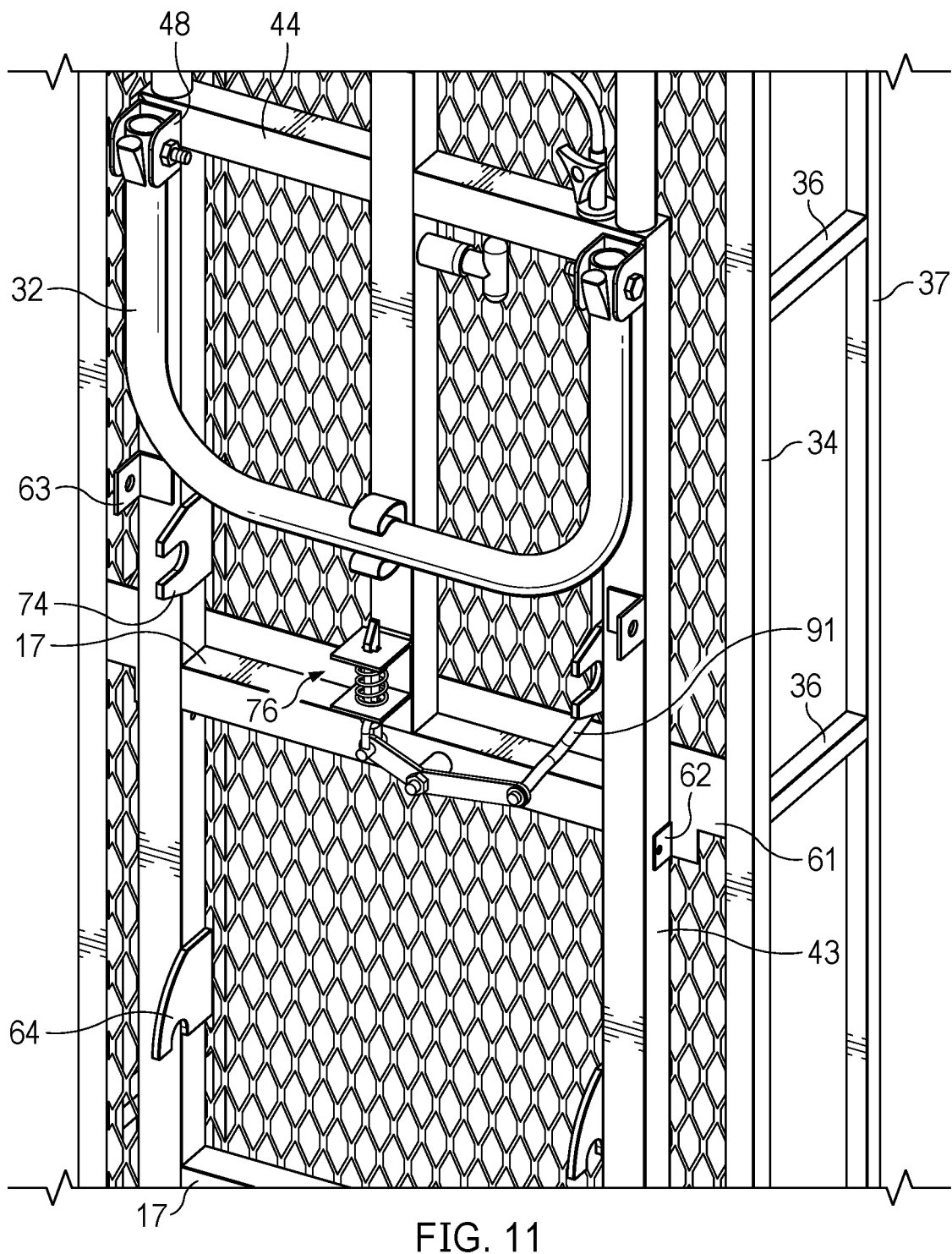
FIG. 11 is a magnified bottom perspective view of the cargo carrier showing the automatic latching mechanism.
Figure 12:
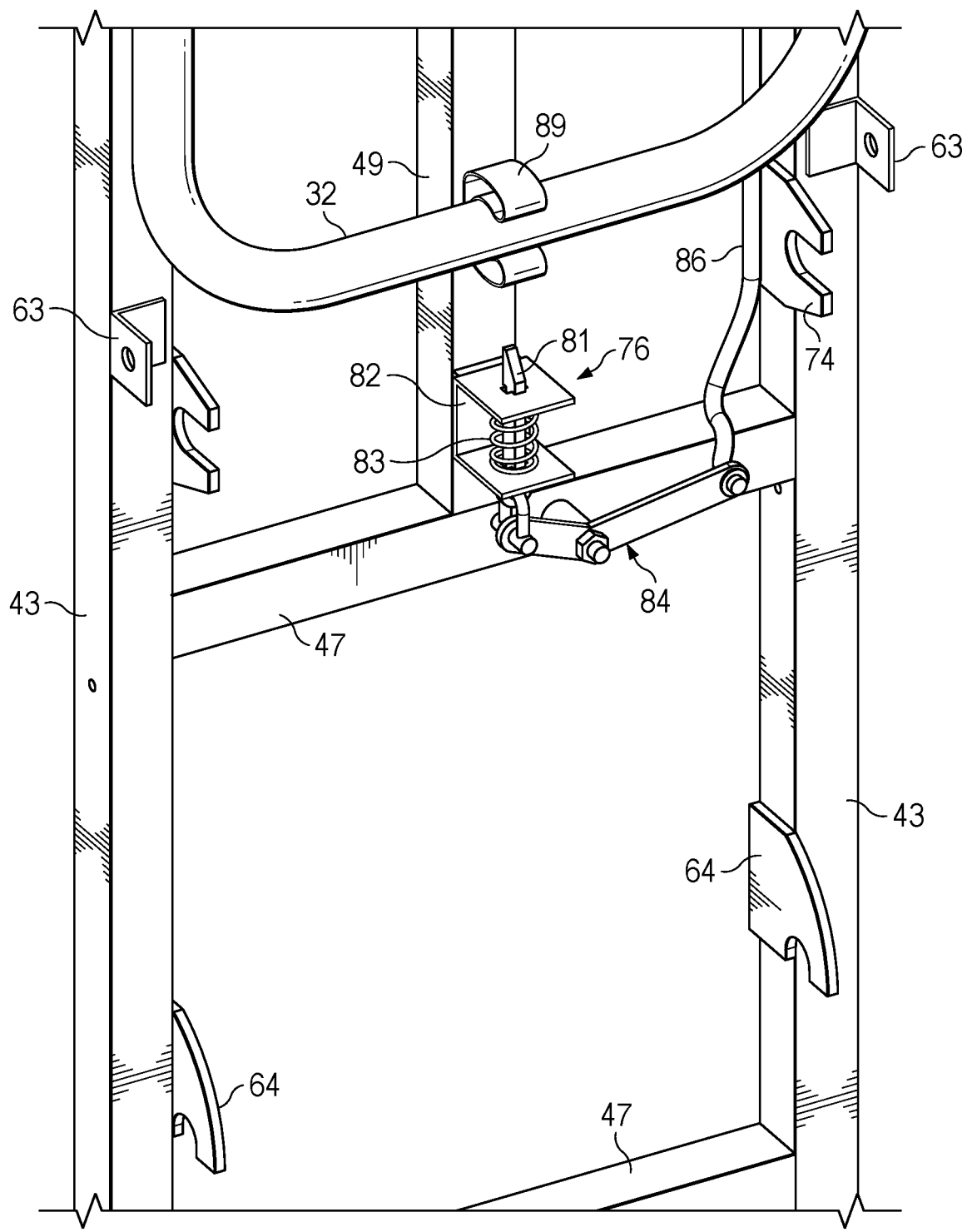
FIG. 12 is an alternate magnified bottom perspective view of the cargo carrier showing the automatic latching mechanism with the wire mesh decking removed.
Figure 13:
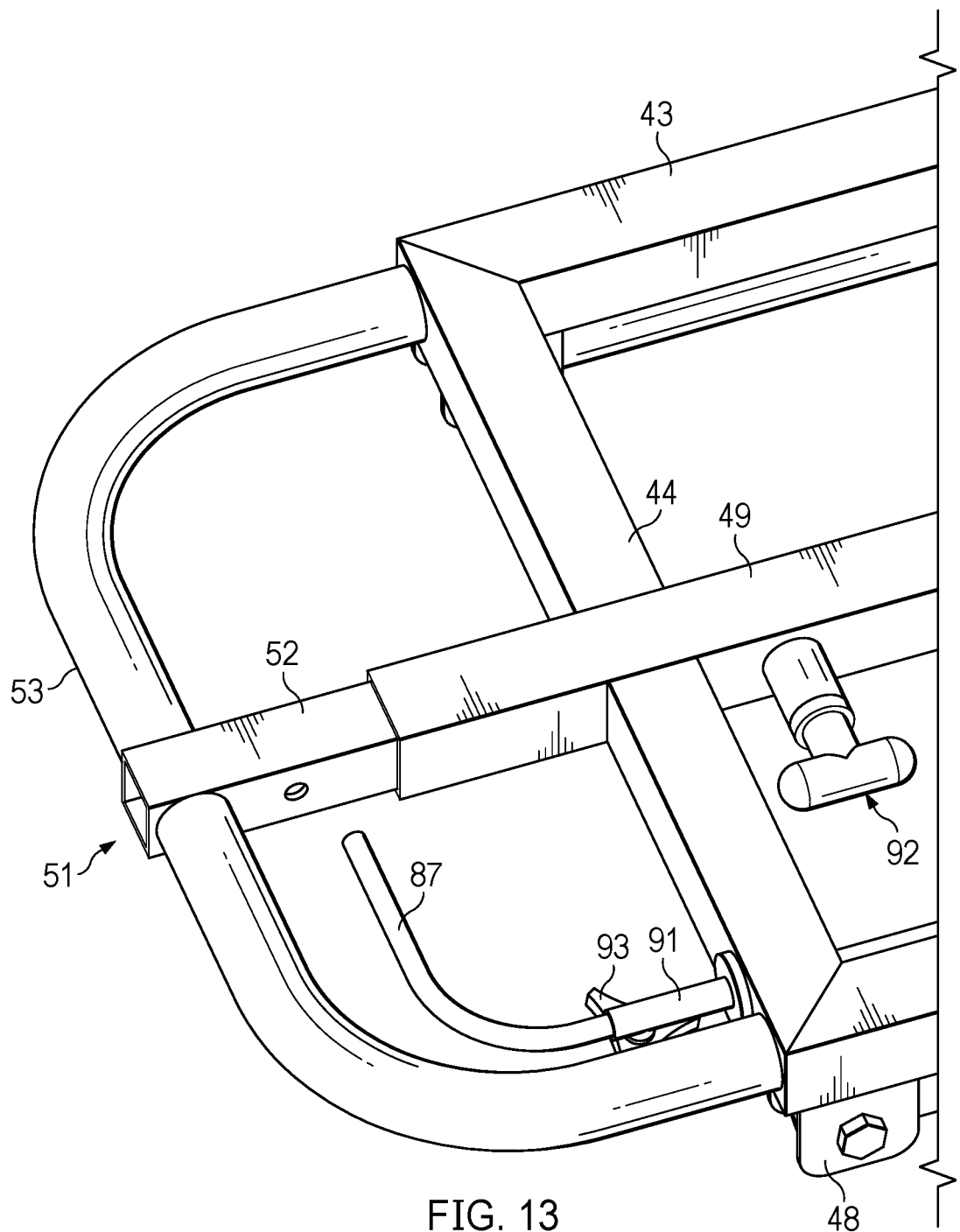
FIG. 13 is a top perspective view of the upper portion of the dolly portion with the cargo basket removed.

Referring to FIGS. 11-13, it may be now seen an automatic locking latch 76, sometimes referred to in the industry as a "slam latch" is positioned on the underside of dolly portion 40 so that when dolly assembly 21 is docked onto loading platform 17 the dolly assembly may be quickly and automatically locked onto the platform 17 with a minimum of effort. Latch 76 includes a spring-loaded locking pin 81 extending through a "C" shaped flange 82 having a spring 83 positioned around pin 81 within the flange 82 as shown. A retraction assembly 84 connects the locking pin 81 to a release arm 86 which travels to a release lever 87 through a guide tube 91 (see FIG. 13). Release lever 87 is curved and conveniently located near handlebar 53 so that a user may release the retract pin 81 with a one hand operation without releasing their grip on handlebar 53. Guide tube 91 includes a tightening knob 93 that allows for the telescoping adjustment of release lever 87 to adjust the distance of release lever 87 in relation to handlebar 53 by loosening and tightening the knob. As shown, another adjustment knob 92 may be similarly loosened to allow the telescoping of tube 52 within central spar 49 but tightened to lock telescoping handlebar 53 at a desired position. Similarly, handlebar 53 has curved outer portions that telescope into side members 43 that correspond to the maximum extent of tube 52 when handlebar 53 is fully extended. Although not shown, one or more side members 43 many include hexagonal locking nuts on their exteriors to either act as additional tightening support to the handlebar members or as a stop to limit the maximum extent of handlebar 53 during extension, such as by contacting an interior feature in support 43 to act as a stop limit.

Referring again to FIG. 11-12, a pair of loading hooks 64 are fixed onto the inner surface of each side member 43 and are positioned so that the concave surface of each hook 64 is positioned towards the lower end of the dolly assembly 21. In addition, a pair of guide members 74 are fixed onto the inner surface of each side member 43 and are positioned closer to the upper end of the dolly assembly 21. The configuration, size and shape of the hooks 64 and guides 74 are such that each cooperatively engages loading bars 28 on loading platform 17 when positioned adjacent to the loading bars and rotated down over loading platform 17. Guide members 74 are also positioned between locking pin 81 and kickstand retention clasp 89 which holds kickstand 32 in place on the underside of dolly portion 40 when in a stowed position as shown in FIG. 12.

Figure 14:
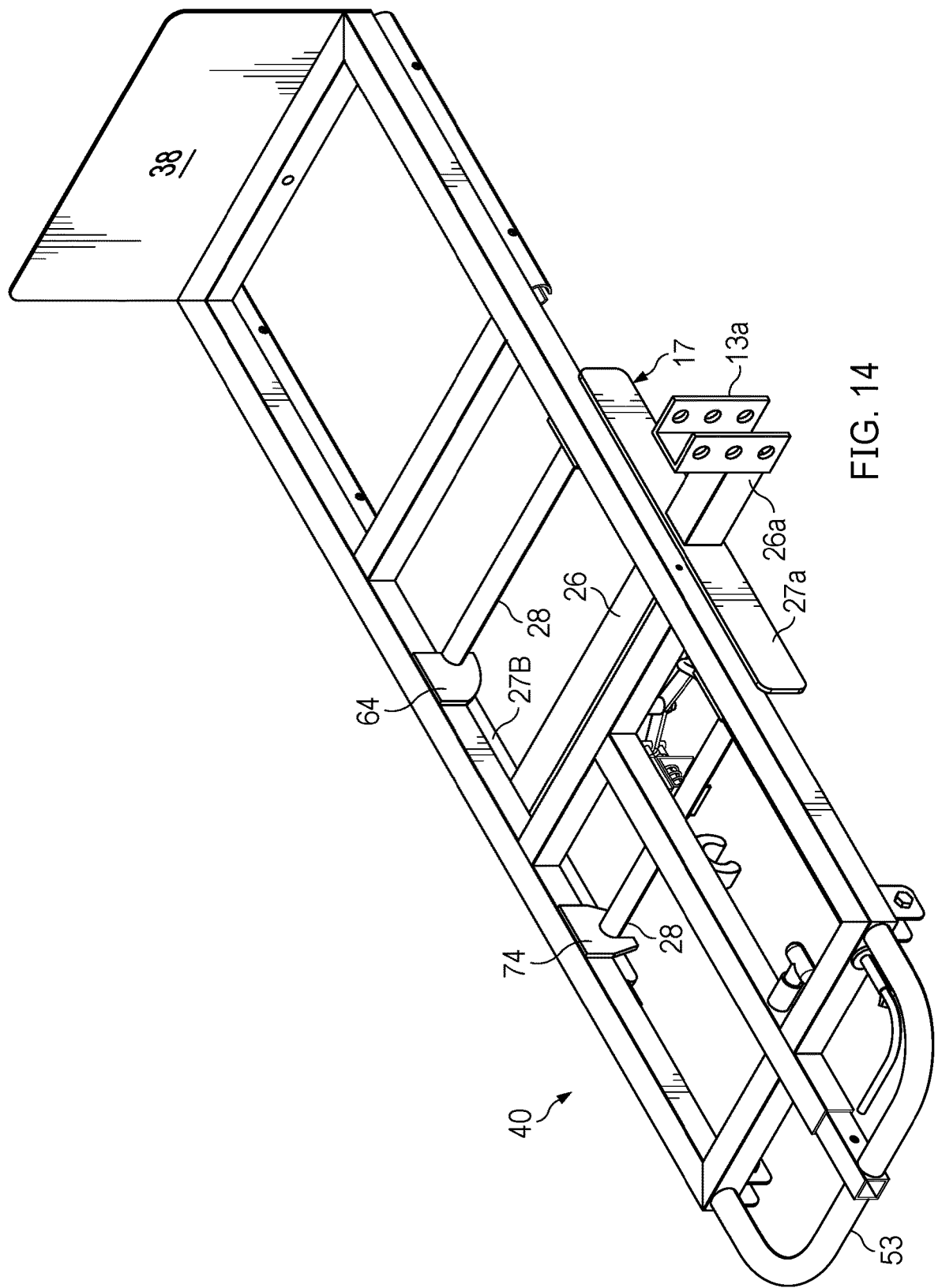
FIG. 14 is a top perspective view of the dolly portion locked on and supported by the loading platform of the cargo carrier.
Figure 15:
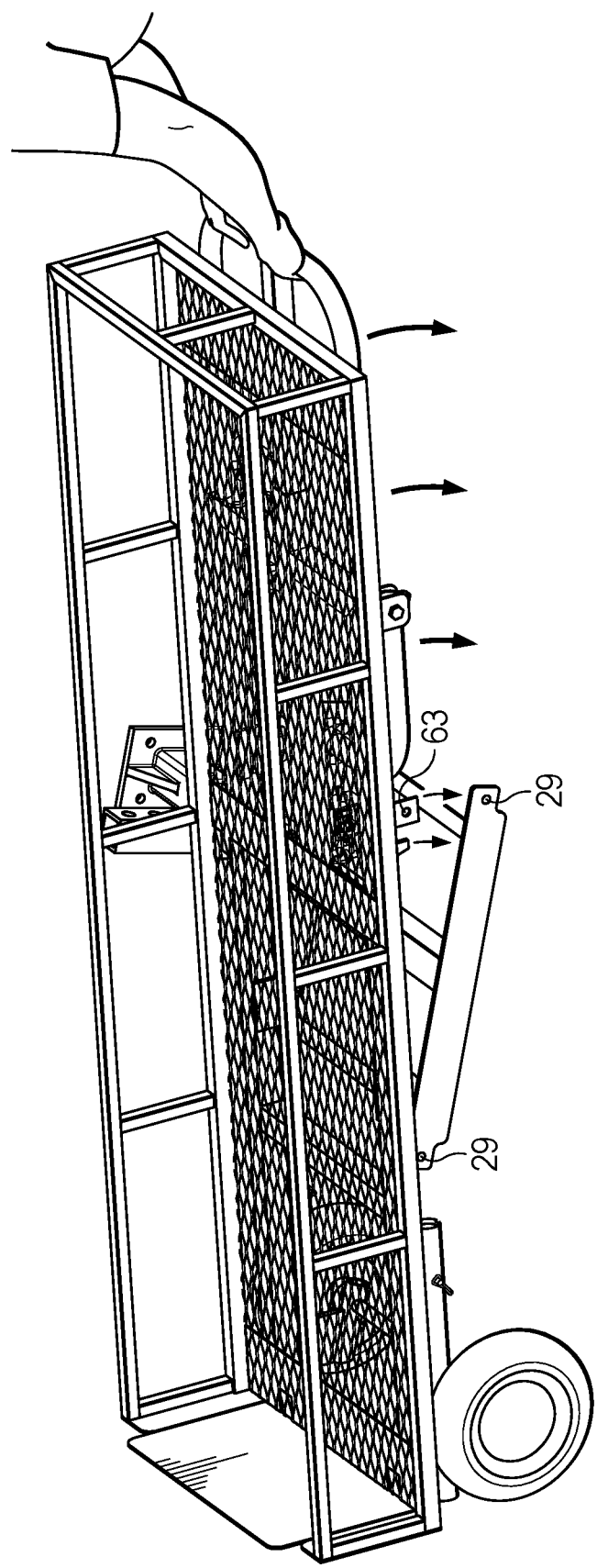
FIG. 15 is a perspective view of the cargo carrier maneuvered into position to lock the carrier onto the loading platform.

Referring to FIGS. 14-15, dolly portion 40 locks onto loading platform 17 by engaging hooks 64 on loading bar 28 such that the concave surface portion of each hook 64 bears against loading bar 28. Guides 74 then are rotated down over oppositely positioned loading bar 28 so that the inner receiving or concave surface of the each guide supports the loading bar 28 within the receiving area. The arrangement of the hooks 64 and guides 74 are such that the loading bar 28 held within the guide members 74 is positioned adjacent to pin 81 of latch 76. The upper surface of pin 81 is beveled such that as guide member 74 contacts and bears down upon pin 81 the pin 81 is forced to retract allowing for the loading bar 28 to pass through onto the non-beveled side of the pin 81, thereby locking the loading bar 28 behind the pin due to the spring-loaded action of the locking pin 81. As depicted in FIG. 15, dolly assembly 21 may be easily and automatically locked onto loading platform 17 by contacting and catching the loading bar 28 on one side of the loading platform and lowering the upper end of dolly assembly 21 over the loading platform until engaging automatic latch 76.

Figure 16A:
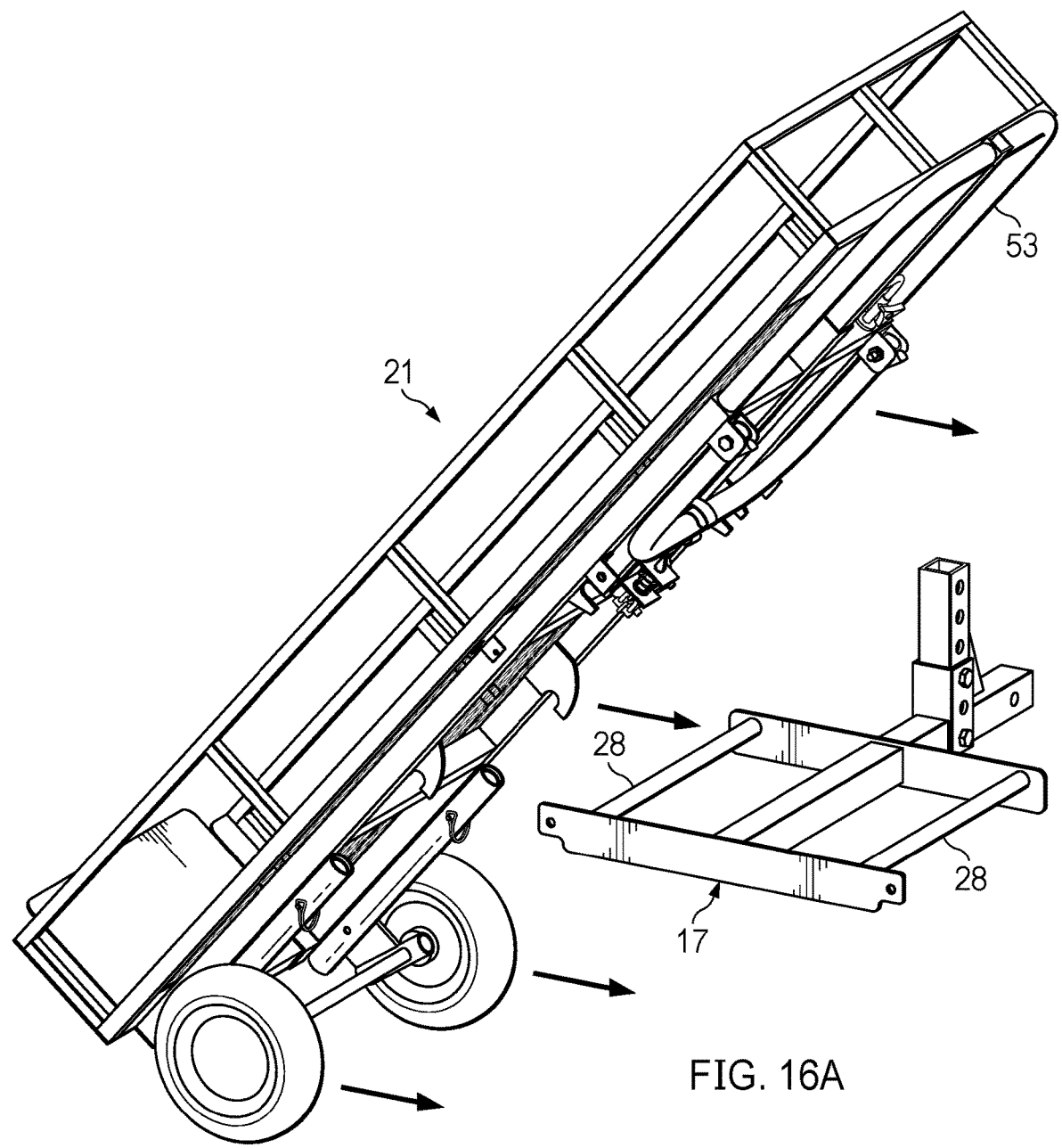
FIGS. 16A-16C show a diagrammatic step rendering of the cargo carrier in order to lock the carrier onto the loading platform.
Figure 16B:
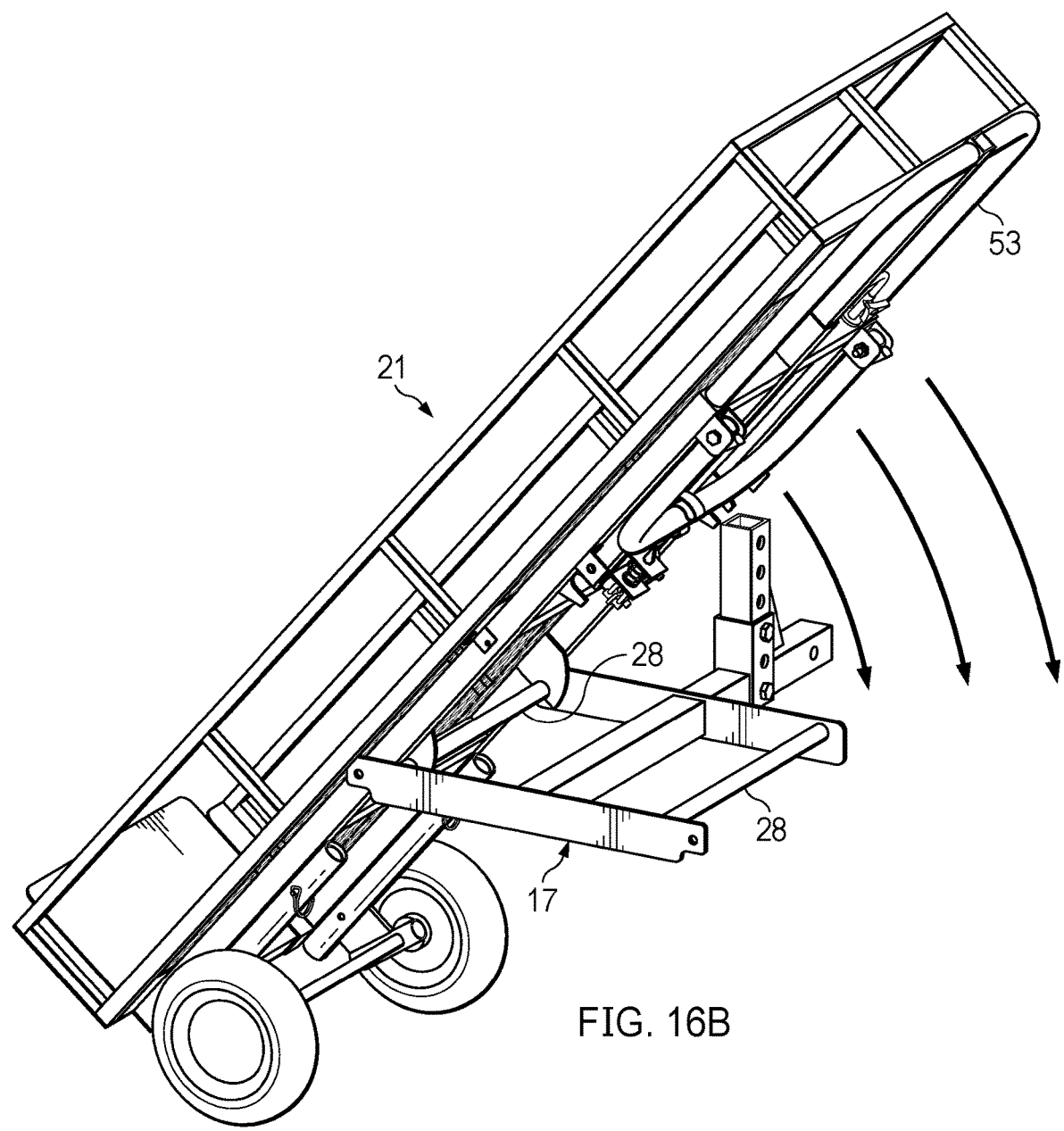
Figure 16C:
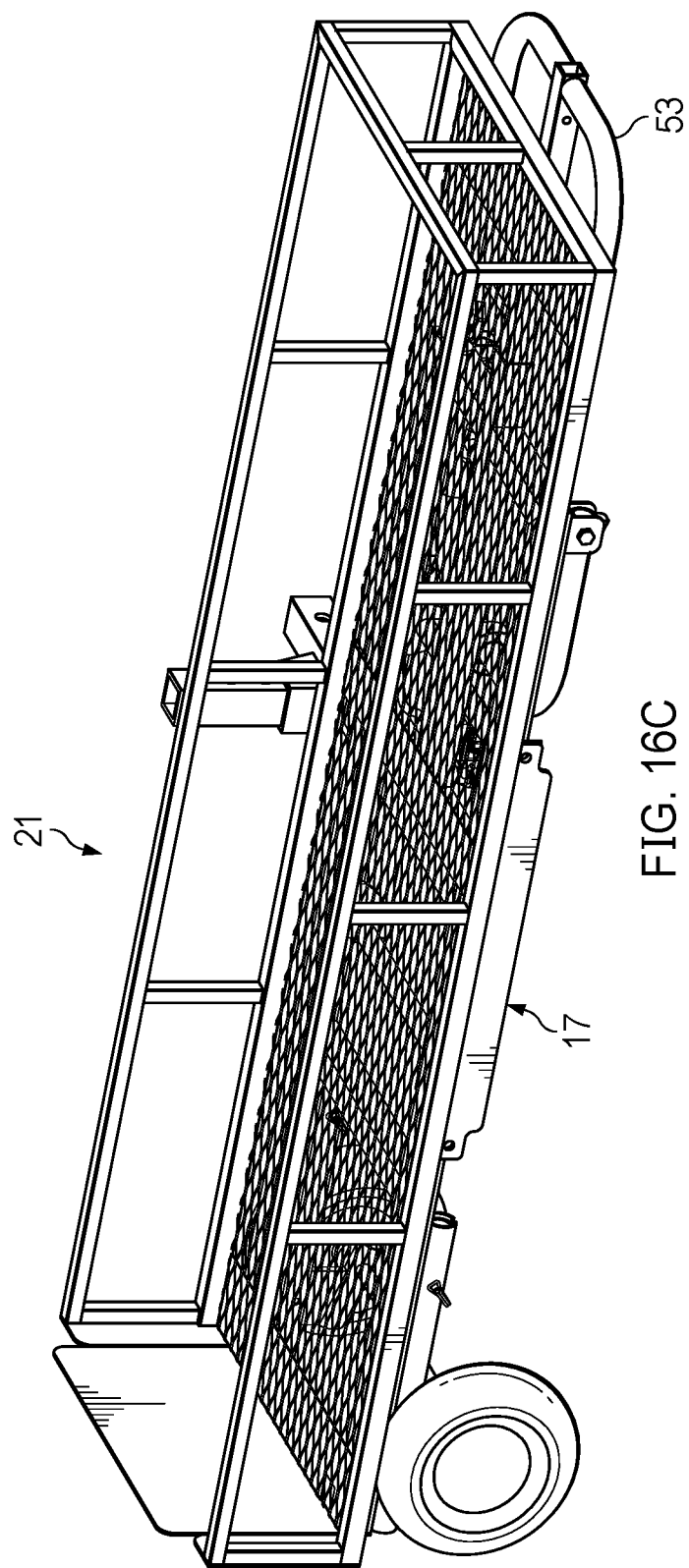

FIGS. 16A-C shows the maneuvering of the dolly assembly 21 into position to lower dolly assembly 21 over the loading platform 17. Dolly 21 presumably loaded with heavy cargo is wheeled toward a side of loading platform 17 until hooks 64 on the underside of dolly assembly 21 contact loading bar 28. Due to the symmetrical positioning of bars 28 in relation to main spar 26, the described loading method will work from either side of the loading platform 17. Pressure of dolly assembly 21 is maintained against loading bars 28 so that as bars 28 contact the inner surface of hooks 64 and loading bar 28 acts as a fulcrum with the pivot point being at the center of the loading bar longitudinal axis as the dolly assembly 21 is lowered over the loading platform 17. Importantly, dolly assembly 21 must be held in a sufficiently vertical position such that each hook 64 engages against and holds bar 28 within the concave inner surface of each hook. Handlebar 53 may then be lowered such that guides 74 move downward toward the oppositely positioned loading bar. Because handlebars 53 are a good distance from the pivot point of the fulcrum, a user may easily lower a heavy load onto platform 17 by taking advantage of the levering effect of the frame of the dolly portion 40 of the dolly assembly 21 to simultaneously rotate the cargo load 24 downward while raising the lower end of the dolly assembly 21 off the ground. A continued rotation movement of the dolly assembly 21 will result in the locking mechanism 76 engaging and locking onto oppositely positioned loading bar 28. A locking pin or lock may then be inserted through aperture 29 to further ensure dolly assembly 21 cannot be withdrawn from latch 76. Wheel assembly 31 is also repositioned or flipped so that the wheels 66 are in an elevated, stowed position away from the ground in preparation for travel.

Reversing the process, while in the horizontal position locked onto the loading platform 17, the user pulls release lever 87 to disengage latch 76 while simultaneously rotating handlebars 53 up and over platform 17. Due to the shape configuration of the hooks 64, once the dolly assembly 21 has rotated upwards, towards vertical with respect to the ground, the hooks automatically allow the dolly assembly 21 to disengage the loading bar 28 and a user can then push the dolly assembly 21 away from the loading platform 17, presumably again loaded with heavy cargo, for further manipulation and travel to a final destination. The amount of rotation angle necessary to unlock the hooks from the loading bar will vary with the loading platform 17 height above the ground.

Figure 17:
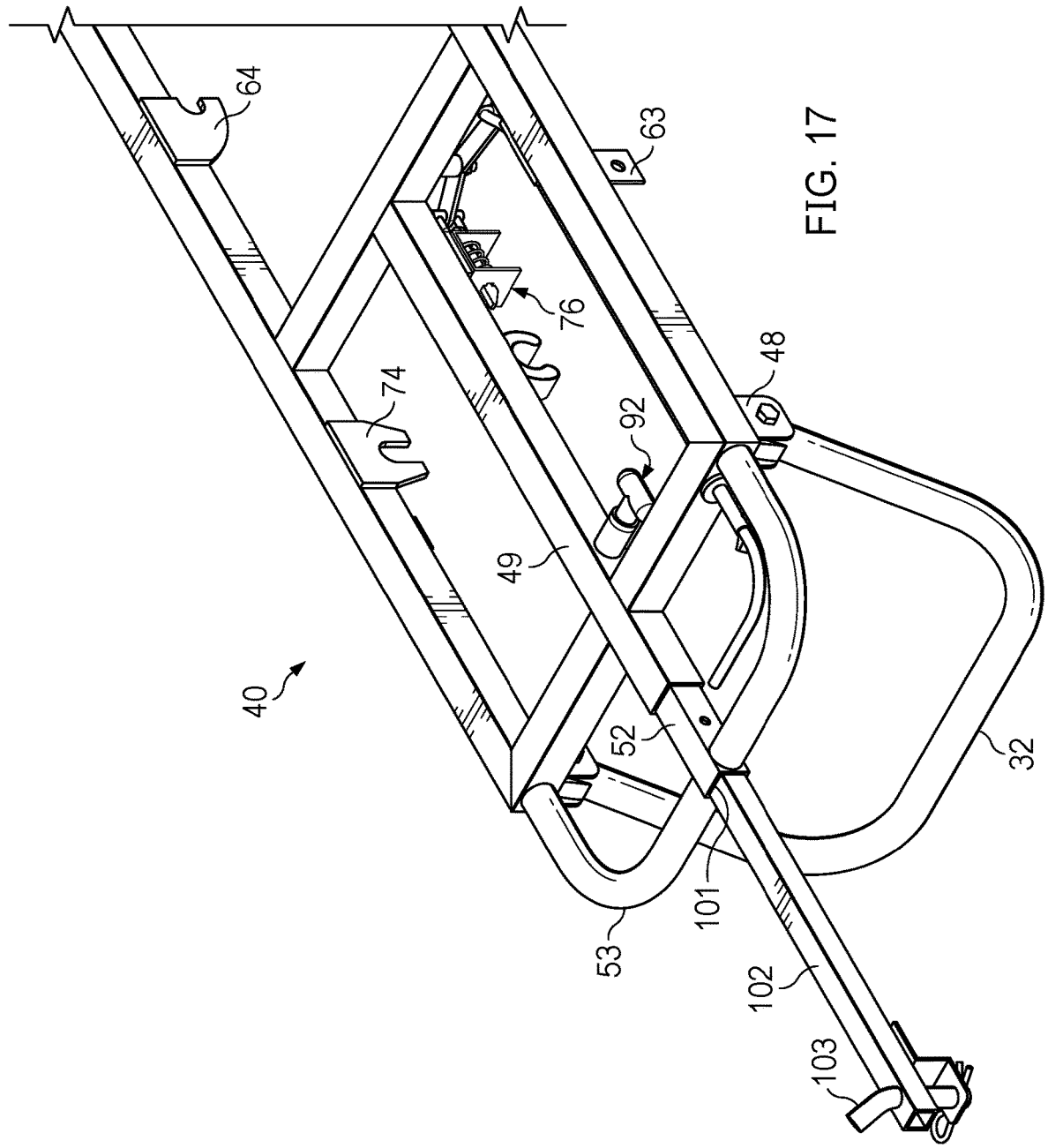
FIG. 17 is a perspective view of the upper or handle end of the dolly portion of the invention with a hitch pin tow bar installed.
Figure 18:
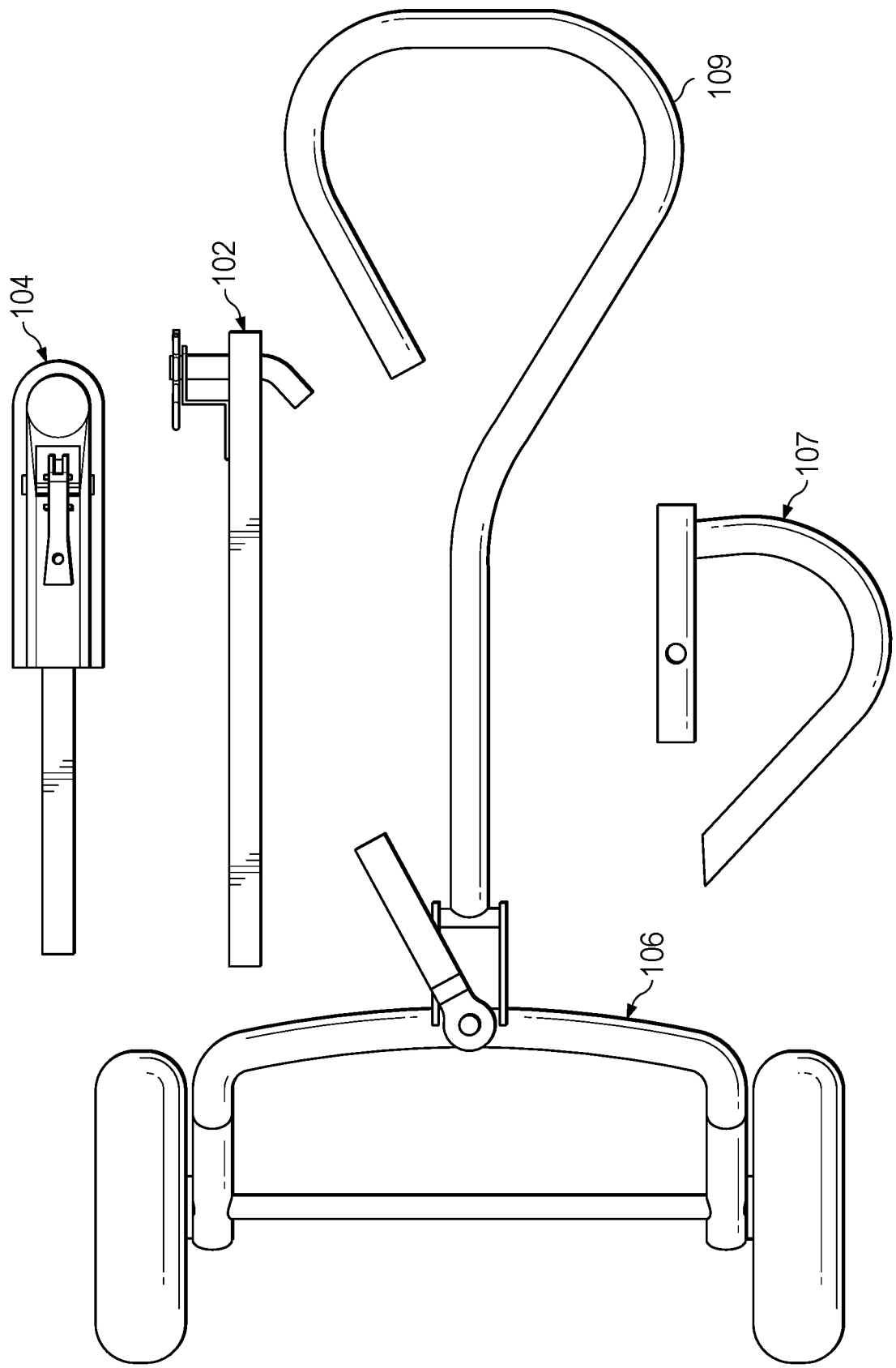
FIG. 18 is a plan view of several accessories that may be integrated into the cargo carrier to expand its functionality.
Figure 19:
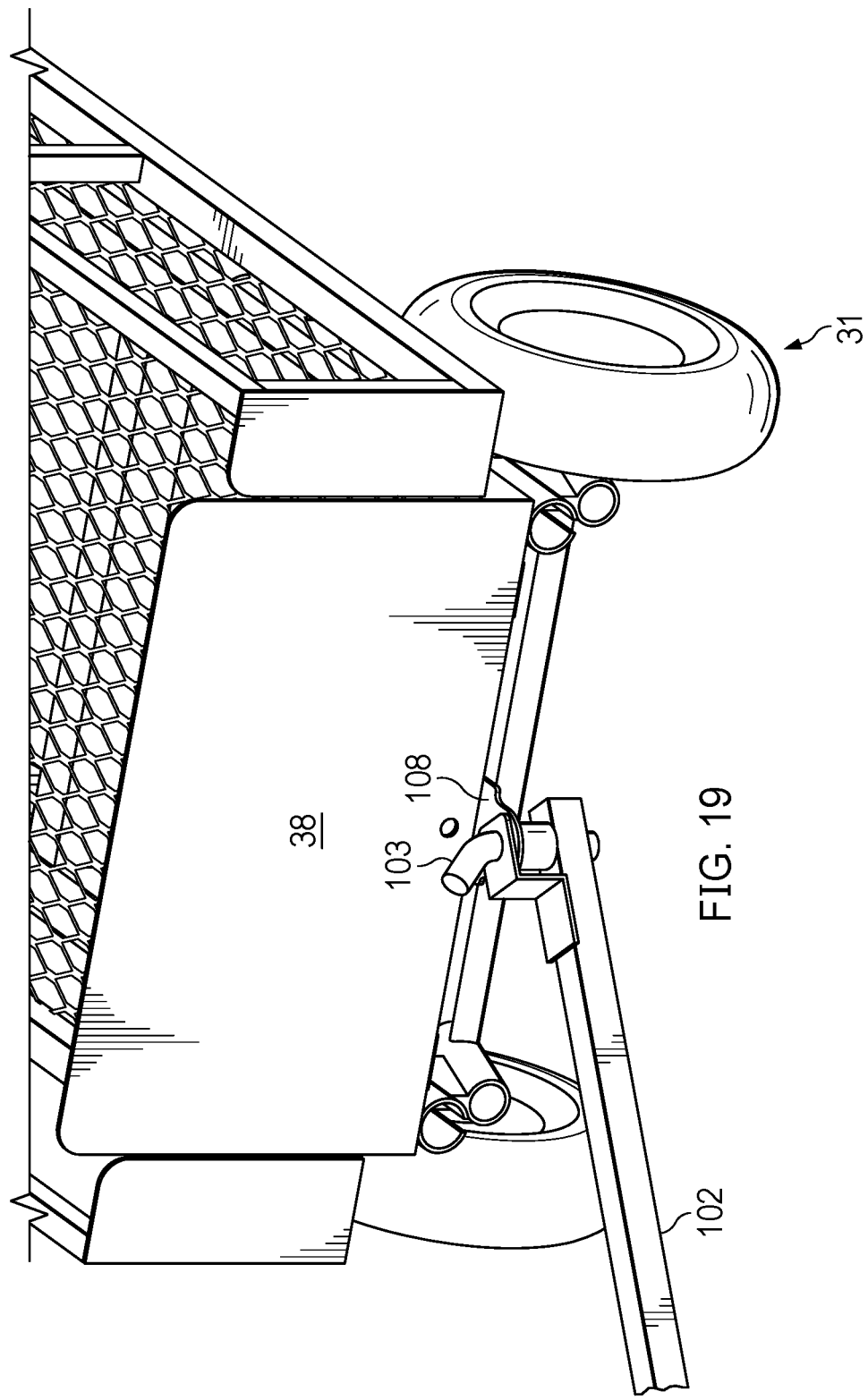
FIG. 19 is a perspective view of the lower or cargo base plate end of the cargo carrier with a hitch pin tow bar installed.
Figure 20:
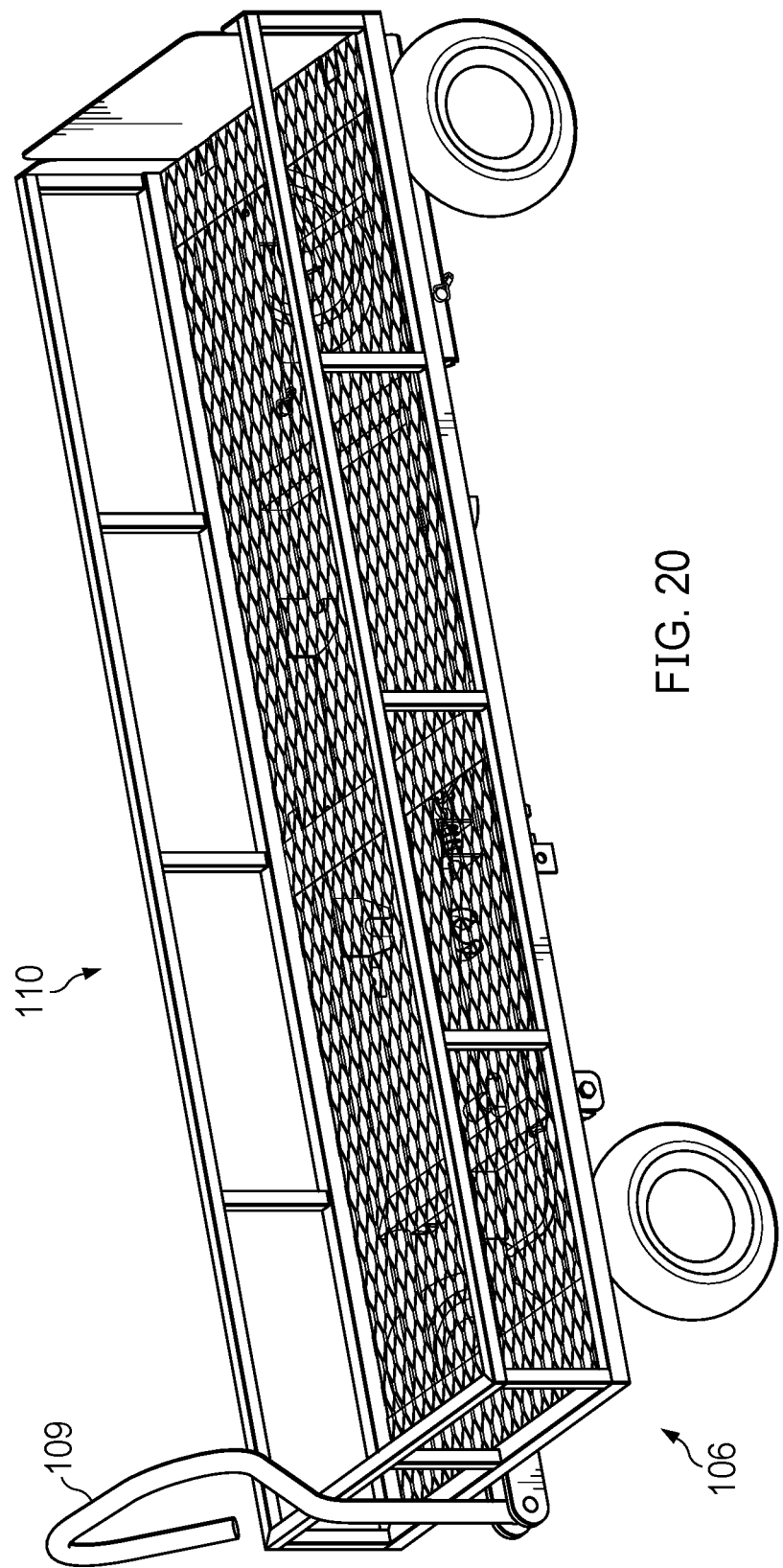
FIG. 20 is a perspective view of the cargo carrier with the wagon wheel and handle accessories installed; and, FIG. 21 is a perspective view of the dolly portion of the cargo carrier without the cargo basket installed in an upright position ready to be manipulated by a user.

Referring now to FIGS. 17-21, carrier 10 includes the capability to add accessories to increase its functionality and utility. FIG. 17 shows an accessory towing mount option added to carrier 10. Telescoping handle 51 includes an open portion 101 in the upper end of rectangular tube 52 that servers as an accessory mount receiver. Opening 101 may receive, for example, a hitch pin tow bar 102 that includes a hitch pin connector 103 for connecting to any hitch pin compatible ring. Many ATVs and small tractors present such rings and thereby are suitable for supporting the upper end of dolly assembly 21 and cargo 24 for motorized movement of cargo 24 to a final destination. Additional accessors include a ball coupler tow bar 104 and a gripping handle 107 usable with the receiver 101. Referring to FIG. 19, an integral tow eye 108 may be affixed to the underside of baseplate 38 at the lower end of dolly assembly 21 so that hitch pin tow bar 102 may be used to connect a plurality of carriers 10 together form a "daisy chain" configuration of a plurality of carts 10.

In a further configuration, a wagon wheel assembly 106 may be affixed to the underside of the dolly assembly 21 near the upper end of the dolly and handle 109. The assembly 106 may be used to pull and steer dolly assembly 21 from the upper end while being supported by 4 wheels horizontally to the ground, thereby providing additional wheel support for an increased heavy load.

Figure 21:
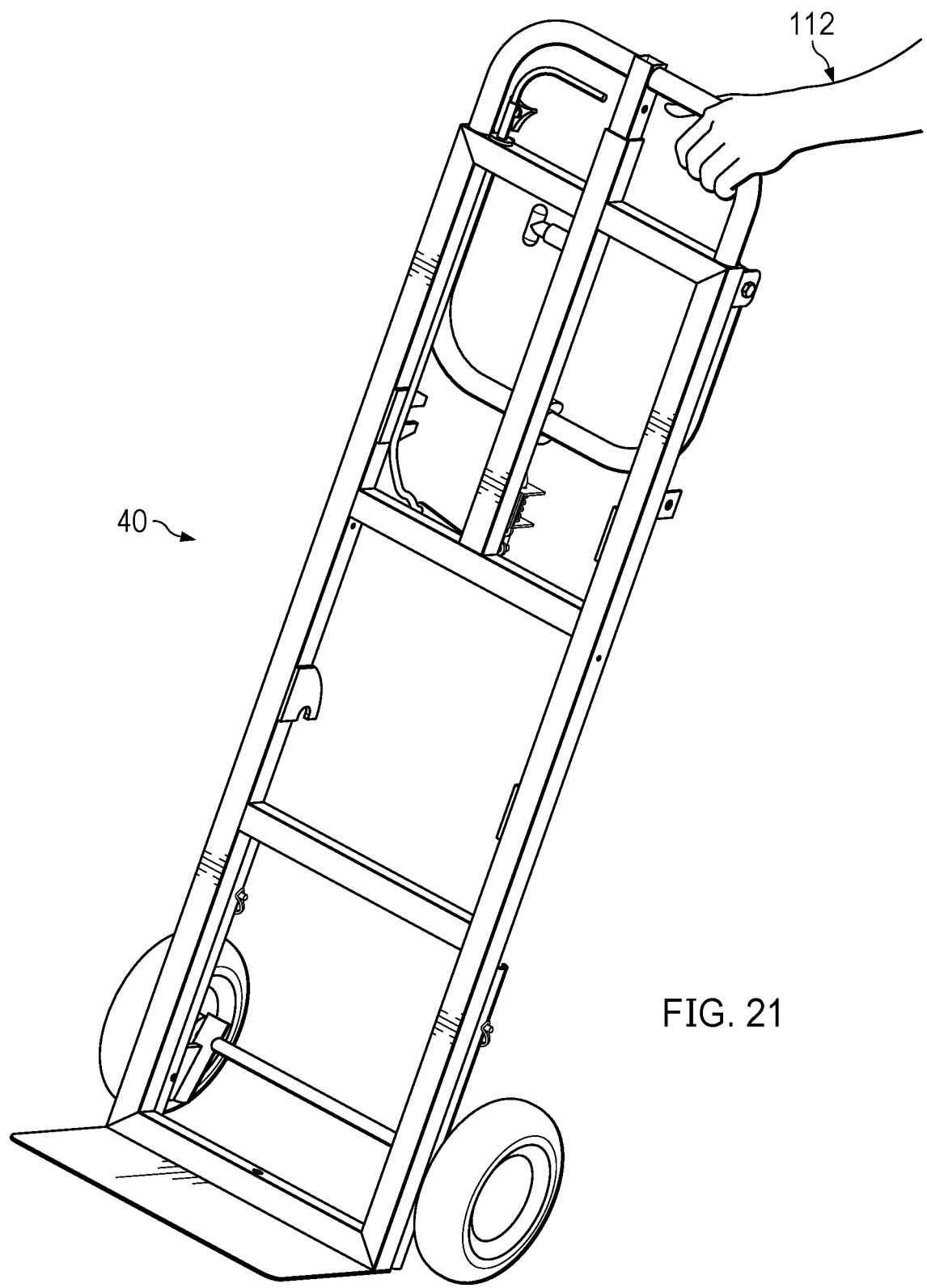

While I have shown my invention in one form, it will be obvious to those skilled in the art that it is not so limited but is susceptible of various changes and modifications without departing from the spirit thereof. For example, it will be understood that dolly portion 40 may be manipulated by a user 112 in a conventional fashion when the cargo basket 22 is removed from dolly portion 40 as shown in FIG. 21. This allows carrier 10 to provide uncompromised versatility for exceedingly heavy objects while still maintaining the ability to quickly load and unload heavy objects from carrier 10 for transportation. It will also be understood that while mainly rectangular support pipes are shown in the preferred embodiment, various shapes and materials for support tubing in dolly 40 may be used including, for example, aluminum material and rounded or oval shaped tubing.

Having set forth the nature of the invention, what is claimed is:

1. A convertible cargo carrier, comprising:
   a. a loading platform having a hitch portion for insertion into a towing receiver on a vehicle, said loading platform including a pair of round loading bars equally spaced from said hitch portion and parallel to one another, wherein each loading bar is adapted for receiving a dolly assembly;
   b. a dolly assembly having a pair of rigid hook-shaped flanges affixed to an underside of said dolly assembly on opposite sides thereof and depending downward therefrom, wherein said flanges are oriented to simultaneously hook over and bear against the surface of a selected one of said support bars and wherein said selected support bar comprises a fulcrum forcing said dolly assembly to rotate around said selected support bar and move downward toward said other support bar so that said dolly assembly may be rotated onto said loading platform; and,
   c. said dolly assembly including a dolly portion supported by a wheel assembly and a removable cargo basket supported by said dolly portion for holding cargo during transportation thereof.

2. A convertible cargo carrier as recited in claim 1, wherein said loading platform comprises:
   a center member extending away from said vehicle and supported by said hitch portion;
   a pair of lateral support members each connected at their centers to said center member and extending away from said center member, wherein said lateral support members connect the ends of said parallel loading bars together; and,
   wherein said pair of parallel loading bars are equally spaced from said center member so that said dolly assembly may be loaded onto said loading platform from either side.

3. A convertible cargo carrier as recited in claim 2, wherein said dolly portion includes a pair of flange guides for engaging said loading bar not comprising a fulcrum, and wherein said cargo carrier further includes an automatically locking latch positioned between said flange guides such that upon the lowering of said dolly assembly onto said loading platform said non-fulcrum loading bar is guided by said pair of flange guides to bear against said latch causing the automatic retention of said dolly assembly upon said loading platform.

4. A convertible cargo carrier as recited in claim 3, wherein said removable cargo basket includes a wire mesh decking for supporting said cargo, and wherein said dolly portion further comprises a wheel assembly moveable from a storage position above said wire mesh decking to a transportable position below said wire mesh decking for transporting said cargo.

5. A convertible cargo carrier as recited in claim 4, wherein said dolly portion comprises a baseplate affixed at one end and a telescoping handle at the other end, and wherein said baseplate and said telescoping handle are connected by a rectangular configuration of support tubes.

6. A convertible cargo carrier as recited in claim 5, wherein said hitch portion comprises:
   a. a member configured to be inserted into a towing hitch receiver;
   b. a vertical member rigidly supported by said insertion member; and,
   c. a clamping section adapted to surround and be rigidly affixed to said vertical member, wherein said vertical member and said clamping section are cooperatively configured to be vertically adjustable relative to one another.

7. A convertible cargo carrier, comprising:
   a. a loading platform having hitch support means for connecting to and being supported by a towing receiver on a vehicle, said loading platform including a pair of circular loading bars equally spaced from said hitch support means and parallel to one another;
   b. a dolly assembly including means on its underside and depending downward therefrom for hooking onto a selected one of said pair of loading bars and bearing against and around the surface of said selected one of said loading bars, wherein said selected loading bar comprises a fulcrum for said hooking means thereby forcing said dolly assembly to rotate around said selected support bar and move downward toward said other support bar; and,
   c. said dolly assembly including a wheel assembly removably affixed to a lower portion thereof for supporting said dolly during the transporting of cargo and a removable cargo basket.

8. A convertible cargo carrier as recited in claim 7, wherein said loading platform comprises:
   a. a center member extending away from said vehicle and supported by said hitch support means;
   b. a pair of lateral support members each connected at their centers to said center member and extending away from said center member; wherein said lateral support members further connect the ends of said parallel loading bars together; and,
   c. wherein said pair of parallel loading bars are equally spaced from said center member so that said dolly assembly may be loaded onto said loading platform from either side.

9. A convertible cargo carrier as recited in claim 8, wherein said dolly assembly includes a pair of flange guides on its underside for engaging one of said loading bars, said dolly assembly further including an automatically closing latch positioned between said flange guides such that upon the lowering of said dolly assembly onto said loading platform one of said loading bars is guided by said pair of flange guides so that said latch automatically engages with and retains said dolly assembly on said loading platform.

10. A method for loading a convertible cargo carrier onto a vehicle from either side of said vehicle, comprising the steps of:
   a. selecting a side of a two-sided loading platform supported by a vehicle towing hitch receiver and maneuvering a wheeled dolly assembly holding cargo adjacent to said selected side of said two sided loading platform, wherein said loading platform includes a pair of parallel circular loading bars each bar equally spaced from and positioned to either side of said towing hitch receiver;
   b. further maneuvering said dolly assembly until said dolly assembly bears against a first one of said pair of loading bars positioned on said selected side of said loading platform, wherein said dolly assembly includes a pair of rigid hook-shaped flanges depending downward from the underside of said dolly assembly, and wherein said dolly assembly is positioned during said further maneuvering step so that said flanges bear against and hook around the curved surface of said first loading bar;
   c. rotating said dolly assembly around said first loading bar while bearing against said flanges so that said dolly assembly and its cargo are lifted off the ground from a substantially vertical position to a horizontal position and onto said loading platform; and,
   d. during said rotation step, automatically latching said dolly assembly onto a second loading bar of said pair of loading bars on said loading platform when said dolly assembly reaches a substantially horizontal position over said loading platform.

11. A method as recited in claim 10, wherein said dolly assembly includes an integrated frame supported by a wheel assembly at one end, and wherein said rotation step further comprises the steps of gripping an upper portion of said integrated frame portion distal from said wheel assembly and pulling said frame portion downwards towards said second loading bar positioned on said loading platform distal from said now hooked first loading bar causing the levered rotation of said dolly assembly around a fulcrum point aligned with the longitudinal axis of said first loading bar, thereby allowing for the levered raising of heavy cargo onto said loading platform.

12. A method as recited in claim 11, further comprising the steps of:
   a. pulling a release lever positioned on said integrated frame at an upper end of said dolly assembly distal said wheel assembly causing the release of a latch holding said dolly assembly on said loading platform;
   b. using said integrated frame on said upper end of said dolly assembly, controllably rotating said lower end of said dolly assembly in downward until said wheel assembly affixed to a lower end of said dolly assembly is supported by the ground; and,
   c. using said integrated frame, maneuvering said dolly assembly to unhook said rigid hook-shaped flanges from said first loading bar for transport of cargo held by said dolly assembly to a final destination.

\* \* \* \* \*